United States Patent
Yang et al.

(10) Patent No.: US 9,100,870 B2
(45) Date of Patent: *Aug. 4, 2015

(54) METHOD FOR TRANSMITTING CHANNEL STATE INFORMATION IN WIRELESS ACCESS SYSTEM

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

This patent is subject to a terminal disclaimer.

(21) Appl. No.: 13/734,798

(22) Filed: Jan. 4, 2013

(65) Prior Publication Data

US 2013/0128813 A1 May 23, 2013

Related U.S. Application Data

(63) Continuation of application No. 13/638,514, filed as application No. PCT/KR2011/002289 on Apr. 1, 2011.

(60) Provisional application No. 61/320,307, filed on Apr. 1, 2010, provisional application No. 61/389,698, filed on Oct. 4, 2010.

(51) Int. Cl.
*H04W 80/04* (2009.01)
*H04W 88/06* (2009.01)
(Continued)

(52) U.S. Cl.
CPC ............ *H04W 24/10* (2013.01); *H04B 7/0626* (2013.01); *H04L 5/0057* (2013.01); *H04L 5/001* (2013.01)

(58) Field of Classification Search
CPC ..... H04W 80/04; H04W 88/06; H04W 28/04; H04W 72/04
USPC ................................................... 370/328, 329
See application file for complete search history.

(56) References Cited

U.S. PATENT DOCUMENTS

| | | | |
|---|---|---|---|
| 2008/0037457 | A1 | 2/2008 | Matsukura et al. |
| 2008/0225744 | A1 | 9/2008 | DiGirolamo et al. |

(Continued)

FOREIGN PATENT DOCUMENTS

| | | |
|---|---|---|
| CN | 101123557 A | 2/2008 |
| CN | 101257367 A | 9/2008 |

(Continued)

*Primary Examiner* — Ronald B Abelson
(74) *Attorney, Agent, or Firm* — Birch, Stewart, Kolasch & Birch, LLP

(57) ABSTRACT

The present invention provides various methods for transmitting channel state information relative to one or more serving cells in a carrier-coupled environment, and devices for supporting the same. As one embodiment of the present invention, a method for reporting channel state information (CSI) in a wireless access system that supports carrier coupling comprises the steps of: allowing a terminal to receive information related to a CSI report mode for one or more serving cells from a base station; and allowing the terminal to report the channel state information (CSI) on the one or more serving cells to the base station by considering the CSI report mode. In this case, if first type CSI for a first serving cell and second type CSI for a second serving cell are transmitted on the same subframe, the terminal can report CSI for one serving cell only, to the base station, according to priorities of CSI report types related to the CSI report mode.

18 Claims, 17 Drawing Sheets

(51) Int. Cl.
*H04W 28/04* (2009.01)
*H04W 72/04* (2009.01)
*H04W 24/10* (2009.01)
*H04B 7/06* (2006.01)
*H04L 5/00* (2006.01)

(56) References Cited

U.S. PATENT DOCUMENTS

| | | |
|---|---|---|
| 2009/0016269 A1 | 1/2009 | Barzaghi et al. |
| 2009/0109917 A1 | 4/2009 | Pajukoski et al. |
| 2010/0027713 A1 | 2/2010 | Huang et al. |
| 2010/0222008 A1 | 9/2010 | Astely et al. |
| 2011/0122794 A1 | 5/2011 | Kim et al. |
| 2012/0076028 A1* | 3/2012 | Ko et al. ................. 370/252 |
| 2012/0140708 A1* | 6/2012 | Choudhury et al. ........ 370/328 |
| 2013/0114455 A1* | 5/2013 | Yoo et al. ................. 370/252 |

FOREIGN PATENT DOCUMENTS

| | | |
|---|---|---|
| CN | 101340378 A | 1/2009 |
| CN | 101374254 A | 2/2009 |
| CN | 101630981 A | 1/2010 |
| CN | 101635950 A | 1/2010 |
| KR | 10-2009-0130295 A | 12/2009 |
| KR | 10-2010-0019315 A | 2/2010 |
| KR | 10-2010-0032884 A | 3/2010 |
| WO | WO 2009-002097 A1 | 12/2008 |

* cited by examiner

METHOD FOR TRANSMITTING CHANNEL STATE INFORMATION IN WIRELESS ACCESS SYSTEM

CROSS REFERENCE TO RELATED APPLICATION

This application is a Continuation of co-pending U.S. application Ser. No. 13/638,514 filed on Sep. 28, 2012, which is the National Phase of PCT/KR2011/002289 filed on Apr. 1, 2011, which claims priority under 35 U.S.C. §119(e) to U.S. Provisional Application No. 61/320,307 filed on Apr. 1, 2010 and to U.S. Provisional Application No. 61/389,698 filed on Oct. 4, 2010, all of which are hereby expressly incorporated by reference into the present application.

TECHNICAL FIELD

The present invention relates to a wireless access system, and more particularly, to various methods for transmitting channel state information on one or more serving cells in a carrier aggregation environment and apparatuses for supporting the same.

BACKGROUND ART

In a general wireless access system, only one carrier is generally considered even though uplink (UL) and downlink (DL) bandwidths are differently configured. For example, a wireless communication system in which the number of carriers constituting each of UL and DL is one and a UL bandwidth and a DL bandwidth are generally symmetrical may be provided based on a single carrier.

In the International Telecommunication Union (ITU), an IMT-Advanced candidate technique demands support of an extended bandwidth compared with a conventional wireless communication system. However, it is not easy to allocate frequency of a wide bandwidth except in some areas of the world. Accordingly, a carrier aggregation (also called bandwidth aggregation or spectrum aggregation) technique for producing an effect as if a broadband is logically used by physically aggregating a plurality of bands in the frequency domain has been developed as a technique for efficiently using a fragmented narrowband.

Carrier aggregation has been introduced to support increased throughput, prevent cost increase caused by introduction of a broadband RF element, and ensure compatibility with existing systems. Carrier aggregation refers to a technique for exchanging data between a User Equipment (UE) and a Base Station (BS) through plural aggregates of carriers in the unit of a bandwidth defined in an existing wireless access system (an LTE system in case of an LTE-A system, or an IEEE 802.16e system in case of an IEEE 802.16m system).

Here, a carrier of the unit of a bandwidth defined in an existing wireless communication system may be called a Component Carrier (CC). Carrier aggregation may include a technique supporting a system bandwidth of up to a maximum of 100 MHz by aggregating a maximum of 5 CCs even if one CC supports, for example, a bandwidth of 5 MHz, 10 MHz, or 20 MHz.

When using the carrier aggregation technique, data can be simultaneously transmitted and received through multiple UL/DL CCs. Hence, a UE is capable of monitoring and calculating all CCs.

DETAILED DESCRIPTION OF THE INVENTION

Technical Problems

To reduce distortion of a power amplifier during UL transmission of a UE, a single carrier property needs to be maintained with respect to a UL transmission signal. To this end, it is necessary to define a UE behavior for maintaining a single carrier property of a UL transmission signal when a plurality of Physical Uplink Control Channels (PUCCHs) should be transmitted through the same subframe.

In one subframe, a UE should transmit control information for one serving cell. If Channel State Information (CSI) for one or more cells is transmitted through the same subframe, a UE behavior for CSI reporting needs to be defined.

Accordingly, it is an object of the present invention to define a UE behavior in UL for CSI transmission for multiple serving cells in a multicarrier aggregation environment.

It is another object of the present invention to provide a method capable of transmitting one piece of control information (i.e. CSI) through one PUCCH, when CSI transmission for a plurality of serving cells is simultaneously demanded through a plurality of PUCCHs in a specific subframe.

It is still another object of the present invention to provide a method for dropping CSI according to priority so that specific CSI alone can be transmitted among plural pieces of CSI. For example, a method is provided through which a UE drops specific CSI according to cell type, CSI transmission period, and/or CSI type.

It will be appreciated by persons skilled in the art that that the technical objects that can be achieved through the present invention are not limited to what has been particularly described hereinabove and other technical objects of the present invention will be more clearly understood from the following detailed description.

Technical Solutions

To achieve the above technical object, the present invention discloses various methods for transmitting CSI for one or more serving cells in a carrier aggregation environment and apparatuses for supporting the same.

According to one aspect of the present invention, a method for reporting Channel State Information (CSI) in a wireless access system which supports carrier aggregation includes receiving, at a User Equipment (UE), information related to a CSI reporting mode for one or more serving cells from a Base Station (BS) and reporting, at the UE, one or more CSI for the one or more serving cells to the BS in consideration of the CSI reporting mode, wherein, if first type CSI for a first serving cell and second type CSI for a second serving cell are transmitted in the same subframe, the UE reports only CSI for one serving cell to the BS according to priority of a CSI reporting type related to the CSI reporting mode.

According to another aspect of the present invention, a method for receiving Channel State Information (CSI) in a wireless access system which supports carrier aggregation includes transmitting, at a Base Station (BS), information related to a CSI reporting mode for one or more serving cells to a User Equipment (UE), and receiving one or more reports on one or more CSI for the one or more serving cells considering the CSI reporting mode from the UE, wherein, if first type CSI for a first serving cell and second type CSI for a second serving cell are transmitted in the same subframe, the BS receives only CSI for one serving cell according to priority of a CSI reporting type related to the CSI reporting mode.

According to a further aspect of the present invention, a User Equipment (UE) for reporting Channel State Information (CSI) in a wireless access system which supports carrier aggregation includes a transmission module for transmitting a channel signal, a reception module for receiving a channel signal, and a processor for supporting CSI reporting, wherein the UE receives information related to a CSI reporting mode for one or more serving cells through the reception module from a Base Station (BS) and reports one or more CSI for the one or more serving cells to the BS in consideration of the CSI reporting mode, and if first type CSI for a first serving cell and second type CSI for a second serving cell are transmitted in the same subframe, the UE reports only CSI for one serving cell to the BS according to priority of a CSI reporting type related to the CSI reporting mode.

In the above aspects of the present invention, if priority of the first type CSI is higher than priority of the second type CSI, the UE may transmit only the first type CSI to the BS and drop the second type CSI.

The first type CSI may indicate that the UE reports a Rank Indicator (RI) and a first Precoding Matrix Indicator (PMI) or only the RI to the BS and the second type CSI may indicate that the UE reports a Wideband Channel Quality Indicator (WB-CQI) and a second PMI, the WB-CQI and the first PMI, or only the WB-CQI to the BS.

The first type CSI may indicate that the UE reports a WB-CQI and a second PMI, the WB-CQI and a first PMI, or only the WB-CQI to the BS and the second type CSI may indicate that the UE reports a Subband CQI (SB-CQI) and the second PMI or only the SB-CQI to the BS.

The first type CSI may indicate that the UE reports an RI and a first PMI or only the RI to the BS and the second type CSI may indicate that the UE reports an SB-CQI and a second PMI or only the SB-CQI to the BS.

In the above aspects of the present invention, the first type CSI and the second type CSI may be configured to support the CSI reporting mode.

In the above aspects of the present invention, reporting the CSI is periodically performed according to each content of the CSI.

In the above aspects of the present invention, the first type CSI may be a CSI reporting type 3 or CSI reporting type 5 and the second type CSI may be a CSI reporting type 2b, a CSI reporting type 2c, a CSI reporting type 4, a CSI reporting type 1, or a CSI reporting type 1a.

Alternatively, the first type CSI may be a CSI reporting type 2b, a CSI reporting type 2c, or a CSI reporting type 4 and the second type CSI may be a CSI reporting type 1 or a CSI reporting type 1a.

In the above aspects of the present invention, the first type CSI may be transmitted to the BS through a Physical Uplink Control Channel (PUCCH) and a Physical Uplink Shared Channel (PUSCH). If the first type CSI is transmitted through the PUSCH, the first type CSI may be piggybacked or multiplexed on uplink data and then transmitted. For example, if the UE is in a simultaneous transmission mode of PUSCH and PUCCH signals, the first type CSI is transmitted through the PUCCH, and if the UE is in an individual transmission mode of a PUSCH and PUCCH signal, the first type CSI is transmitted through the PUSCH by being piggybacked on uplink data.

The above aspects of the present invention are merely some parts of the exemplary embodiments of the present invention and other embodiments into which the technical features of the present invention are incorporated can be derived and understood by those skilled in the art from the detailed description of the present invention which follows.

Effects of the Invention

The embodiments of the present invention have the following effects.

First, a single carrier property for a UL transmission signal during UL transmission of a UE can be maintained using the embodiments of the present invention.

Second, when CSI for one or more serving cells is transmitted through the same subframe, collision between CSI can be prevented by reporting CSI according to defined UE behavior for CSI reporting. Namely, CSI may be dropped according to priority so as to transmit specific CSI alone among plural pieces of CSI, thereby preventing collision between CSI.

Third, when CSI transmission for a plurality of serving cells is simultaneously demanded through a plurality of PUCCHs in the same subframe, one piece of control information (i.e. CSI) can be transmitted through one PUCCH.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

Figure 1:
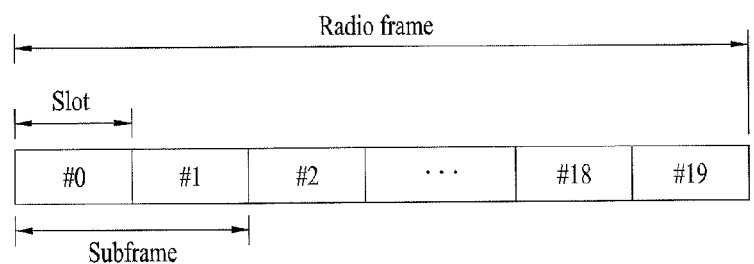
FIG. 1 is a diagram illustrating a radio frame structure which can be used in embodiments of the present invention.

Embodiments of the present invention disclose various methods for transmitting CSI for one or more serving cells in a carrier aggregation environment and apparatuses for supporting the same and also disclose PHICH allocation methods.

The following embodiments are realized by combinations of elements and features of the present invention in a predetermined form. It may be considered that the elements or features are optional unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps, which may obscure the substance of the present invention, are not explained. In addition, procedures or steps, which can be understood by those skilled in the art, are not explained.

In the exemplary embodiments of the present invention, a description is given of data transmission and reception between a Base Station (BS) and a Mobile Station (MS). Here, the term 'BS' refers to a terminal node of a network communicating directly with the MS. In some cases, a specific operation described as being performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with terms such as fixed station, Node B, eNode B (eNB), Advanced Base Station (ABS), access point, etc.

The term 'MS' may be replaced with terms such as User Equipment (UE), Subscriber Station (SS), Mobile Subscriber Station (MSS), mobile terminal, Advanced Mobile Station (AMS), terminal, etc.

A transmitting end refers to a fixed and/or mobile node which transmits a data service or a voice service and a receiving end refers to a fixed and/or mobile node which receives a data service or a voice service. Therefore, in UL, an MS may be a transmitting end and a BS may be a receiving end. Similarly, in DL, the MS may be a receiving end and the BS may be a transmitting end.

The embodiments of the present invention can be supported by standard documents disclosed in at least one of wireless access systems including an IEEE 802.xx system, a 3rd Generation Partnership Project (3GPP) system, a 3GPP LTE system, and a 3GPP2 system. Especially, the embodiments of the present invention can be supported by 3GPP TS 36.211, 3GPP TS 36.212, 3GPP TS 36.213, and 3GPP TS 36.321 documents. That is, obvious steps or portions that are not described in the embodiments of the present invention can be described with reference to the above documents. In additional, for description of all terms used herein, reference can be made to the above standard documents.

Reference will now be made in detail to the exemplary embodiments of the present invention in conjunction with the accompanying drawings. The detailed description, which will be given below with reference to the accompanying drawings, is intended to explain exemplary embodiments of the present invention, rather than to show the only embodiments that can be implemented according to the invention.

In addition, the specific terms used in the embodiments of the present invention are provided to aid in understanding of the present invention and those terms may be changed without departing from the spirit of the present invention.

The following technology can be used for a variety of radio access techniques, for example, Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA).

CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as IEEE 802.11 (Wi-Fi), IEEE 802.16 (WiMax), IEEE 802-20, and Evolved UTRA (E-UTRA).

UTRA is a part of the Universal Mobile Telecommunications System (UMTS). 3GPP Long Term Evolution (LTE) is a part of Evolved UMTS (E-UMTS) employing E-UTRA and uses OFDMA in DL and SC-FDMA in UL. An LTE-Advanced (LTE-A) system is an evolved version of a 3GPP LTE system. To clarify description of technical features of the present invention, although 3GPP LTE/LTE-A is mainly described, the technical sprit of the present invention is not limited thereto.

1. Basic Structure of 3GPP LTE/LTE-A System

FIG. 1 is a diagram illustrating a radio frame structure which can be used in embodiments of the present invention.

A radio frame includes 10 subframes and each subframe includes two slots. A time for transmitting a subframe is defined as a Transmission Time Interval (TTI). One subframe has a length of 1 ms and one slot has a length of 0.5 ms.

One slot includes a plurality of Orthogonal Frequency Division Multiplexing (OFDM) symbols in the time domain and a plurality of Resource Blocks (RBs) in the frequency domain. The OFDM symbol expresses one symbol period in a 3GPP LTE system using an Orthogonal Frequency Division Multiplexing Access (OFDMA) scheme on DL. That is, the OFDM symbol may be called an SC-FDMA symbol or symbol period according to a multiple access scheme. An RB is a resource allocation unit and includes a plurality of consecutive subcarriers in one slot.

The radio frame structure shown in FIG. 1 is purely exemplary and various modifications may be made in the number of subframes included in the radio frame, the number of slots included in the subframe, and the number of OFDM symbols included in the slot.

Figure 2:
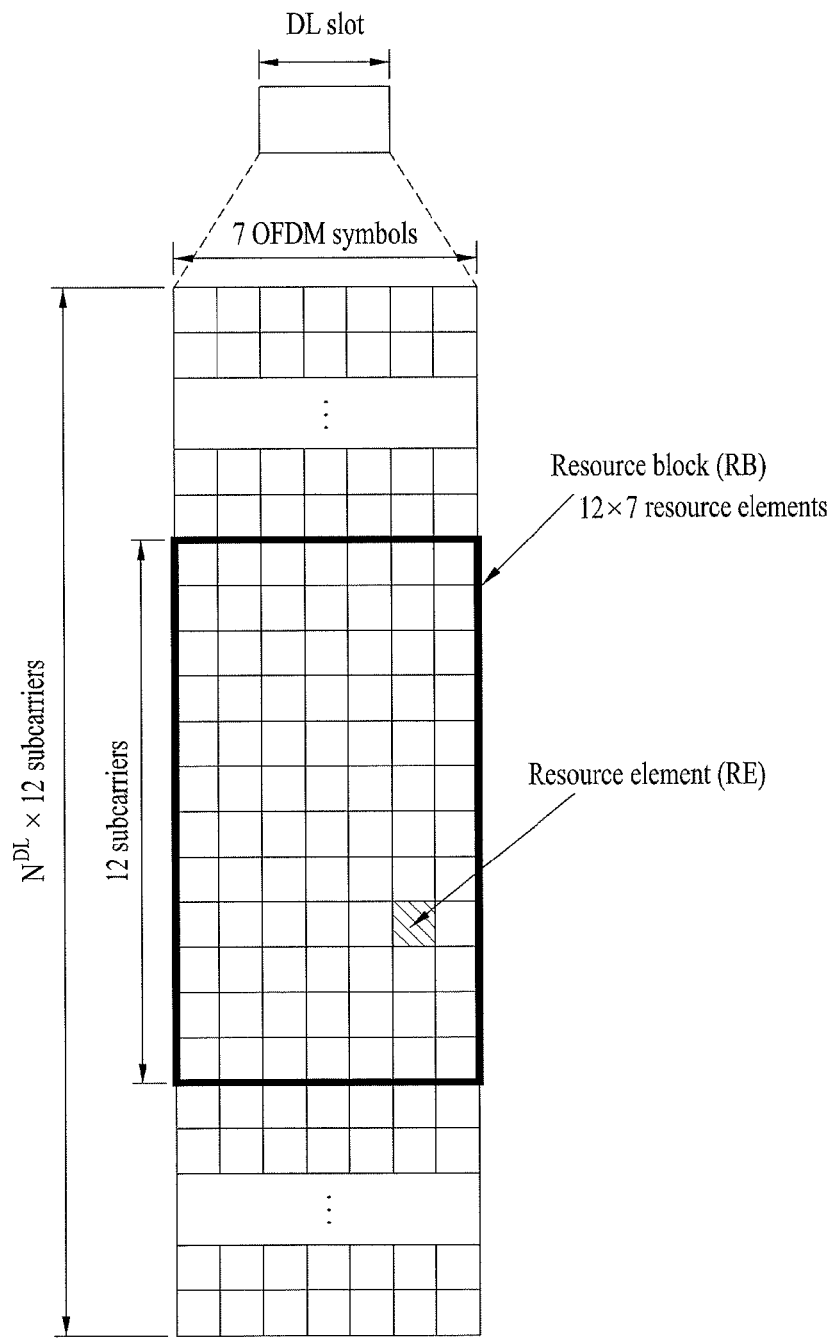
FIG. 2 is a diagram illustrating a resource grid for one DL slot which can be used in embodiments of the present invention.

FIG. 2 illustrates a resource grid for one DL slot which can be used in embodiments of the present invention.

A DL slot includes a plurality of OFDM symbols in the time domain. In the illustrated example of FIG. 2, one DL slot includes 7 OFDM symbols and one RB includes 12 subcarriers in the frequency domain.

Each element on a resource grid is referred to as a Resource Element (RE). One RB includes 12×7 REs. The number of RBs included in a DL slot, $N^{DL}$, depends on DL transmission bandwidth.

Figure 3:
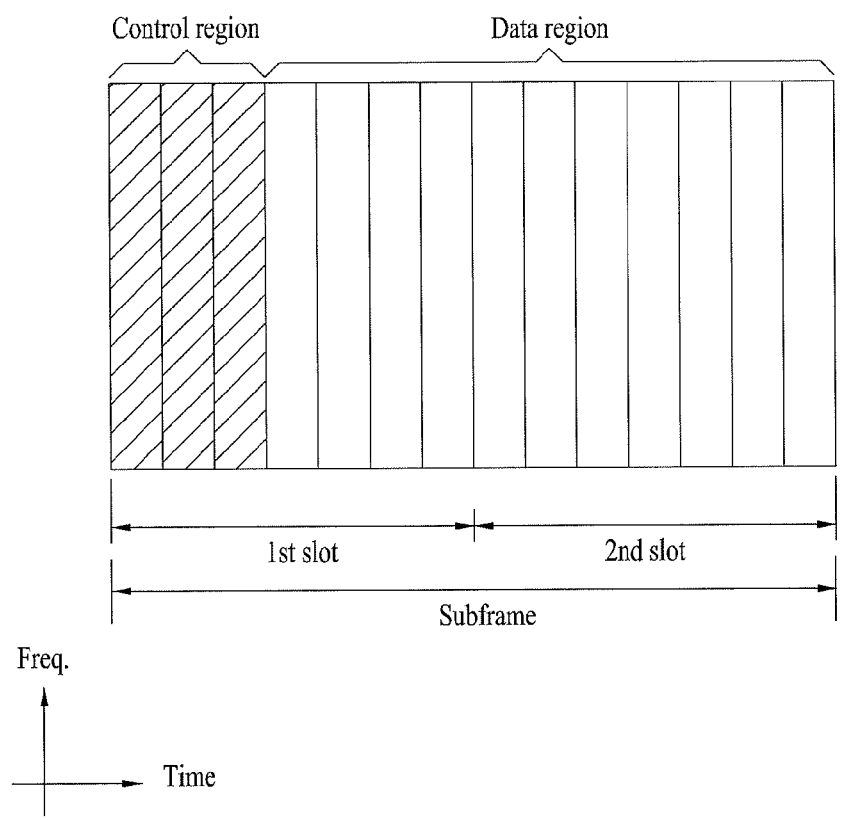
FIG. 3 is a diagram illustrating a DL subframe structure which can be used in embodiments of the present invention.

FIG. 3 is a diagram illustrating a DL subframe structure which can be used in embodiments of the present invention.

A subframe includes two slots in the time domain. A maximum of 3 OFDM symbols in the front portion of the first slot in a subframe corresponds to a control region to which control channels are allocated and the remaining OFDM symbols correspond to a data region to which a Physical Downlink Shared Channel (PDSCH) is allocated.

DL control channels used in a 3GPP LTE system include a Physical Control Format Indicator Channel (PCFICH), a Physical Downlink Control Channel (PDCCH), and a Physical Hybrid-ARQ Indicator Channel (PHICH). A PCFICH signal transmitted on the first OFDM symbol of a subframe carries information about the number of OFDM symbols (i.e. the magnitude of the control region) used for control channel signal transmission in the subframe. The PHICH carries an Acknowledgment/Negative-Acknowledgment (ACK/NACK) signal for a UL Hybrid Automatic Repeat Request (HARQ). In other words, the ACK/NACK signal for UL data transmitted by a UE is transmitted over the PHICH.

DL control information transmitted through the PDCCH is referred to as Downlink Control Information (DCI). The DCI includes resource allocation information for a UE or a UE group and includes other control information. For example, the DCI may include UL resource allocation information, DL resource allocation information, a UL transmit power control command, etc.

The PDCCH may carry a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information for a higher-layer control message such as a random access response transmitted on the PDSCH, a transmit power control command set for individual UEs in a UE group, a transmit power control command, activation information of a Voice over IP (VoIP), and the like.

A plurality of PDCCHs may be transmitted in the control region. A UE may monitor a plurality of PDCCHs. The PDCCH is transmitted on one or more consecutive Control Channel Elements (CCEs). A CCE is a logical allocation unit used to provide the PDCCH with a coding rate based on a radio channel state. The CCE corresponds to a plurality of Resource Element Groups (REGs). A format of the PDCCH and the number of available bits of the PDCCH are determined according to the correlation between a code rate provided in the CCE and the number of CCEs. A BS determines the PDCCH format according to DCI to be transmitted to a UE and attaches a Cyclic Redundancy Check (CRC) to control information.

The CRC is masked together with a Radio Network Temporary Identifier (RNTI) according to the used method or owner of the PDCCH. If the PDCCH is dedicated to a specific UE, an identifier of the UE (e.g. cell-RNTI (C-RNTI)) is masked to the CRC. If the PDCCH is dedicated to a paging message, a paging identifier (e.g. paging-RNTI (P-RNTI)) is masked to the CRC. If the PDCCH is for system information (especially, a system information block), a system information identifier and a system information RNTI (S-RNTI) may be masked to the CRC. A Random Access RNTI (RA-RNTI) may be masked to the CRC in order to indicate a random access response to reception of a random access preamble of a UE.

In a carrier aggregation environment, a PDCCH may be transmitted through one or more CCs and include resource allocation information for one or more CCs. For example, although the PDCCH is transmitted through one CC, the PDCCH may include resource allocation information for one or more PDSCHs and PUSCHs.

Figure 4:
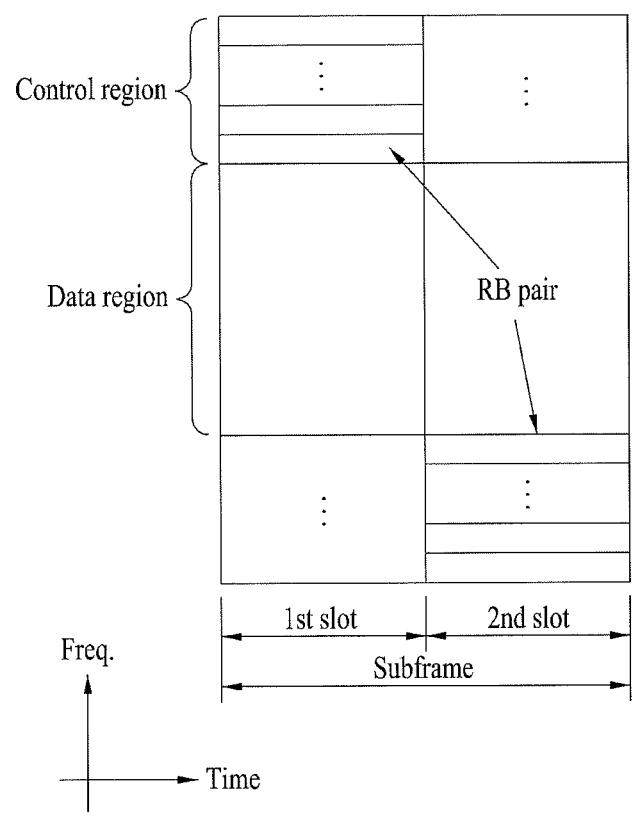
FIG. 4 is a diagram illustrating a UL subframe structure which can be used in embodiments of the present invention.

FIG. 4 is a diagram illustrating a UL subframe structure which can be used in embodiments of the present invention;

Referring to FIG. 4, a UL subframe includes plural (e.g. two) slots. Each slot may include a different number of SC-FDMA symbols according to the length of a Cyclic Prefix (CP). The UL subframe is divided into a data region and a control region in the frequency domain. The data region includes a Physical Uplink Shared Channel (PUSCH) and is used to transmit data signals including voice information. The control region includes a PUCCH and is used to transmit Uplink Control Information (DCI). The PUCCH includes an RB pair located at both ends of the data region in the frequency domain and is hopped using the slot as a boundary. In an LTE system, a UE does not transmit a PUCCH signal and PUSCH signal at the same time in order to maintain a single carrier property.

A PUCCH for one UE is allocated in an RB pair in a subframe and RBs belonging to the RB pair occupy different subcarriers in each of two slots. Thus, the RB pair allocated to the PUCCH is 'frequency-hopped' at a slot boundary.

The PUCCH may be used to transmit the following control information.

Scheduling Request (SR): SR is used for requesting UL-SCH resources and is transmitted using an On-Off Keying (OOK) scheme.

HARQ ACK/NACK: HARQ ACK/NACK is a response signal to a DL data packet on a PDSCH. HARQ ACK/NACK indicates whether or not a DL data packet has been successfully received. 1-bit ACK/NACK is transmitted as a response to a single DL codeword, and 2-bit ACK/NACK is transmitted as a response to two DL codewords.

Channel Quality Indicator (CQI): CQI is feedback information for a DL channel. Multiple Input Multiple Output (MIMO)-associated feedback information includes a Rank Indicator (RI) and a Precoding Matrix Indicator (PMI). 20 bits are used per subframe.

The amount of UCI that can be transmitted in a subframe by a UE is dependent upon the number of SC-FDMA symbols available for UCI transmission. The SC-FDMA symbols available for UCI transmission indicate the remaining SC-FDMA symbols other than SC-FDMA symbols that are used for reference signal transmission in a subframe. In the case of a subframe in which a Sounding Reference Signal (SRS) is configured, the last SC-FDMA symbol of the subframe is also excluded. The reference signal is used for coherent detection of a PUCCH. The PUCCH supports 7 formats according to transmission information.

Table 1 shows the mapping relationship between PUCCH and UCI for use in LTE.

TABLE 1

| PUCCH Format | UCI |
| --- | --- |
| Format 1 | Scheduling request (SR) |
| Format 1a | 1-bit HARQ ACK/NACK with/without SR |
| Format 1b | 2-bit HARQ ACK/NACK with/without SR |

TABLE 1-continued

| PUCCH Format | UCI |
|---|---|
| Format 2 | CQI (20 coded bits) |
| Format 2 | CQI and 1- or 2-bit HARQ ACK/NACK for extended CP |
| Format 2a | CQI and 1-bit HARQ ACK/NACK |
| Format 2b | CQI and 2-bit HARQ ACK/NACK |

2. Channel Quality Indicator (CQI)

(1) CQI Overview

For efficient communication, it is desirable for network entities to feed back channel information to each other. For example, DL channel information is fed back to UL and UL channel information to DL. Such channel information is referred to as CQI.

The CQI may be generated by various methods. For example, the CQI may be generated as information quantizing a channel state itself, as information calculating a Signal-to-Interference plus Noise Ratio (SINR), or as information indicating a state to which a channel is actually applied, such as a Modulation Coding Scheme (MCS).

Hereinafter, a method for generating a CQI based on MCS information, e.g., a CQI generation method for a transmission scheme of HSDPA etc. in 3GPP will be described. The MCS information includes information about a modulation scheme, a coding scheme, and a coding rate according to the modulation scheme and the coding scheme. Therefore, when a CQI is generated based on an MCS, if the modulation scheme and/or the coding scheme are changed, the CQI should vary according thereto. That is, at least one CQI is needed per codeword.

In addition, if a MIMO system is applied to a network, the number of necessary CQIs is also changed. Because the MIMO system generates multiple channels using multiple antennas, plural codewords are usable. Accordingly, the number of CQIs is desirably increased as the number of codewords is increased. Notably, when the number of CQIs is increased, the amount of control information to be transmitted by network entities is proportionally increased.

Figure 5:
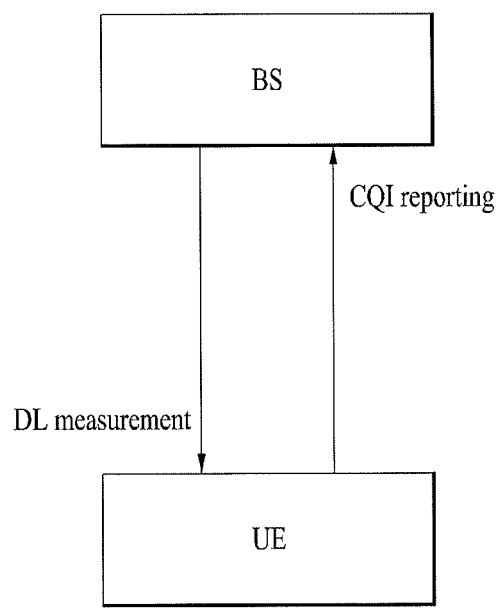
FIG. 5 is a diagram illustrating one of UL CQI transmission methods.

FIG. 5 is a diagram illustrating one of UL CQI transmission methods.

A UE may measure DL channel quality while monitoring a DL channel and report a selected CQI value based on the measured channel quality to a BS through a UL control channel. The BS performs DL scheduling (e.g. UE selection, resource allocation, etc.) according to the reported CQI value.

The CQI value may be set as an SINR, Carrier-to-Interference plus Noise Ratio (CINR), Bit Error Rate (BER), and/or Frame Error Rate (FER) of a channel and a value converted into transmittable data. In a MIMO system, feedback information including RI, PMI, etc. may be added to the CQI value as information indicating a channel state.

(2) Frequency Band Characteristics of CQI

A link adaptation scheme may be used to maximally use the channel capacity of a radio channel in a wireless access system. The link adaptation scheme refers to a scheme for adjusting an MCS and a transmission power according to a given channel To use the link adaptation scheme in a BS, CQI information needs to be fed back to the BS from a UE.

If a frequency band used in a network exceeds a coherence bandwidth, a channel abruptly varies in one bandwidth. A multicarrier system such as an OFDM system includes multiple subcarriers in a given bandwidth. In this case, since a modulated symbol is transmitted through each subcarrier, a channel signal may be transmitted per subcarrier to optimally transmit the channel signal. However, in the multicarrier system including a plurality of subcarriers, since channel information should be fed back every subcarrier, feedback channel information (e.g. control signals) may be abruptly increased. Accordingly, embodiments of the present invention propose various CQI generation methods for reducing control signal overhead.

(3) CQI Generation Method

Various CQI generation methods for reducing the amount of CQI information which is correspondingly increased as the transmission amount of channel signals is increased will now be described.

1) The first method is to change the unit of channel information transmission. For example, multiple subcarriers may be integrated into one subcarrier group and CQI information may be transmitted on a group basis. Namely, if 12 subcarriers are formed as one subcarrier group in an OFDM system using 2048 subcarriers, a total of 171 subcarrier groups is formed. Accordingly, the amount of actually transmitted channel information is reduced to 171 from 2048.

In embodiments of the present invention, a basic unit of a method for integrating one or more subcarriers into one group and reporting a CQI in the unit of a subcarrier group is defined as a CQI subcarrier group or a CQI subband. In addition, if frequency bands do not distinguish between subcarriers, the whole frequency band may be divided into partial frequency bands and a CQI may be generated based on the divided frequency bands. In this case, the divided frequency bands for CQI generation may be defined as CQI subbands.

2) Second, a CQI may be generated by compressing channel information. For example, this method compresses channel information in each subcarrier using a compression scheme in an OFDM scheme and transmits the compressed channel information. Schemes such as Discrete Cosine Transform (DCT) may be considered as the compression scheme.

3) Third, a specific frequency band may be selected to generate channel information and a CQI for the selected specific frequency band may be generated. For example, this method includes a best-M scheme in which an arbitrary number of best subcarriers (e.g. M subcarriers) is selected from among subcarriers or subcarrier groups and then transmitted, instead of transmitting channel information in all subcarriers as in an OFDM system. When the CQI is generated and transmitted by selecting a frequency band, actually transmitted channel information may be broadly divided into two parts: one is a CQI value and the other is a CQI index.

(4) Frequency Band Selective CQI Generation Method

A method for generating and transmitting a frequency band selective CQI will be described hereinbelow.

Figure 6:
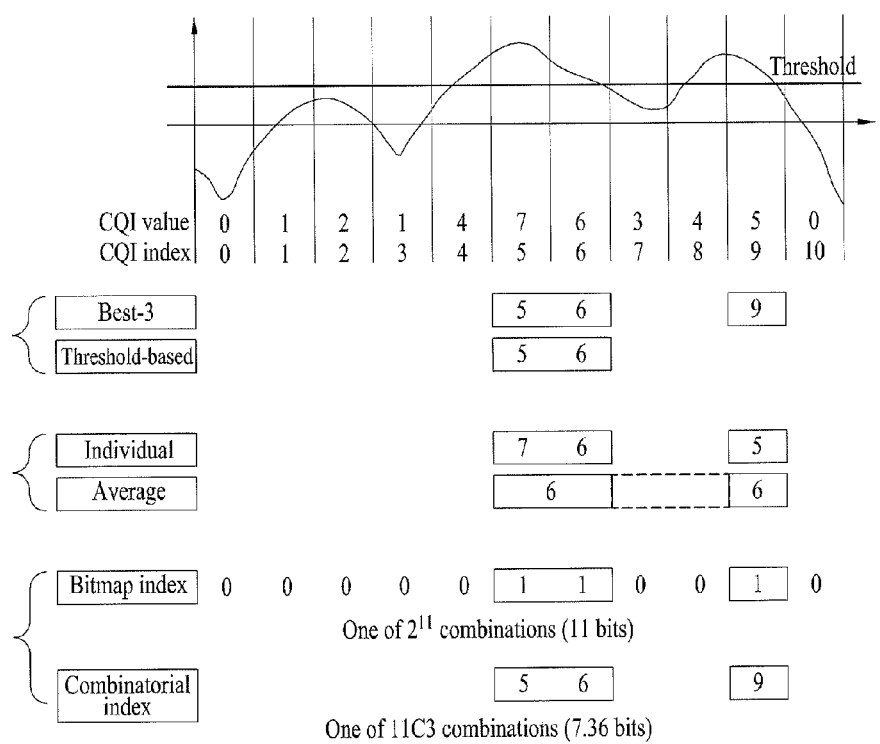
FIG. 6 is a diagram illustrating frequency band selective CQI generation methods.

FIG. 6 is a diagram illustrating frequency band selective CQI generation methods.

The frequency band selective CQI generation methods broadly include three methods. The first method is to select a frequency band (i.e. CQI subband) for generating a CQI. The second method is to generate and transmit control information by manipulating CQI values of selected frequency bands. The third method is to transmit indexes of selected frequency bands (i.e. CQI subbands).

FIG. 6 shows the CQI subband selection method including i) a best-M scheme, and ii) a threshold based selection scheme. In the best-M scheme, network entities select M best CQI subbands having a good channel state. FIG. 6 shows the case where 3 best CQI subbands having a good channel state (i.e. a high CQI value) are selected from among subbands. Referring to FIG. 6, 3 subbands having a high CQI value, i.e. subbands of CQI indexes 5, 6, and 9 may be selected.

In the threshold based scheme, CQI subbands having a channel state value higher than a predetermined threshold value are selected. For example, in FIG. 6, a user may select CQI subbands having a CQI value higher than the threshold value, i.e. CQI subbands of indexes 5 and 6.

Meanwhile, the second method for generating control information by manipulating CQI values includes iii) an individual transmission scheme, and iv) an average transmission scheme. In the individual transmission scheme, all CQI values of CQI subbands selected from the above method i) are individually transmitted. In the individual transmission scheme, if the number of selected CQI subbands is increased, the number of CQI values to be transmitted is correspondingly increased.

In the average transmission scheme, an average value of CQI values of selected CQI subbands is transmitted. Accordingly, the average transmission scheme has the advantage of transmitting only one CQI value irrespective of the number of selected CQI subbands. Nonetheless, accuracy of a CQI value in each subband is lowered because the average of multiple CQI subbands is transmitted. The average transmission method may use a simple arithmetic average or the average of CQI values considering channel capacity.

Moreover, the method for transmitting an index of a CQI subband includes v) a bitmap index scheme, and vi) a combinatorial index scheme. In the bitmap index method, one bit is allocated to each of all CQI subbands. If a CQI subband is selected, a bit of the CQI subband is set to '1' and, otherwise, it is set to '0'. Through the bitmap index scheme, which CQI subband is used is easily indicated. However, the bitmap index scheme should use a constant number of bits regardless of how many CQI subbands are used.

In the combinatorial index scheme, how many CQI bands are to be used is predetermined and combinations corresponding to the number of used CQI subbands among all CQI subbands are mapped to indexes. For example, if a total of N CQI subbands is present and M CQI subband indexes among the N CQI subbands are used, the total number of possible combinations is indicated by the following Equation 1.

$$_N C_M = \frac{N!}{(N-M)!M!} \quad \text{Equation 1}$$

The number of bits indicating the number of cases derived from Equation 1 may be obtained by the following Equation 2.

$$\lceil \log_2(_N C_M) \rceil = \left\lceil \log_2\left(\frac{N!}{(N-M)!M!}\right) \right\rceil \quad \text{Equation 2}$$

Referring to FIG. 6, the total number of CQI subbands is 11. If Equation 1 and Equation 2 are used to select three CQIs, then $_{11}C_3=165$ and the number of bits indicating 165 cases is 8 ($2^7 \leq {_{11}C_3} \leq 2^8$).

(5) CQI Transmission Amount Increase Method

The number of CQIs transmitted by network entities may increase according to various dimensions. First, a CQI increase in a spatial domain will now be described. If a plurality of codewords is transmitted through a plurality of layers in a MIMO system, multiple CQIs are needed according to the codewords.

For example, a maximum of two codewords may be used in MIMO of a 3GPP LTE system and, in this case, two CQIs are needed. If one CQI is comprised of 4 bits and two codewords are present, the CQI should be comprised of a total of 8 bits. Since all users transmit such a CQI to indicate a channel state, overhead caused by the CQI is abruptly increased in terms of radio resources. Accordingly, it is desirable to reduce the size of CQI information bits in terms of channel capacity.

A CQI increase in a frequency domain will now be described. If a receiver selects a frequency band of the best channel state and transmits only the selected frequency and if a transmitter provides a service only through the selected frequency band, a CQI is required in only one band. Although such a scheme is suitable for a single user environment, it is not suitable for a multiuser environment because the frequency having the best channel state cannot be allocated to all users.

Problems occurring during a scheduling process when the CQI is transmitted in only one preferred band are as follows. If frequency bands preferred by multiple users do not overlap, there is no problem. However, simultaneous selection of a specific frequency band by multiple users as the best channel environment is problematic.

Namely, users other than selected users cannot use the corresponding frequency band. If each user transmits only one preferred frequency band, there is no way to provide a service to the unselected users. To solve the above problem and effectively obtain multiuser diversity gain, CQI transmission for multiple frequency bands is required.

When CQIs corresponding to multiple frequency bands are transmitted, the amount of CQI transmission information is increased as many as selected frequency bands. For example, if users select three frequency bands in order of a good channel state and transmit respective CQIs and frequency band indicators, the transmission amount of CQIs increases by three times. Further, additional indicators need to be transmitted to indicate the frequency bands selected by the users.

In addition, CQIs in both spatial and frequency domains may be considered. Multiple CQIs may be needed in the spatial domain and multiple CQIs may be needed in the frequency domain.

Furthermore, a CQI increase in other dimensions may be considered. For example, if a Code Division Multiple Access (CDMA) scheme is used, signal strength and interference amount for each spread codeword are changed. Hence, CQIs may be transmitted and received according to each spread codeword and the number of CQIs may be increased in a codeword dimension.

To reduce the transmission amount of CQIs which is increased according to each domain, the concept of a differential CQI may be introduced. For instance, a user may normally transmit one CQI and transmit only a difference value between the one CQI and the other CQIs, thereby reducing the amount of CQI information. The differential CQI may be understood as a similar concept to differential modulation in a modulation/demodulation scheme. For example, if a plurality of CQIs is expressed in a differential scheme, a large number of bits may be allocated as a CQI reference value and a relatively small number of bits may be allocated as a differential value, thereby reducing the transmission amount of CQIs.

(6) CQI Transmission Mode

A UL channel used for CQI transmission in a 3GPP LTE system is shown in Table 2 below.

TABLE 2

| Scheduling Scheme | Periodic CQI Transmission | Aperiodic CQI Transmission |
|---|---|---|
| Frequency non-selective | PUCCH | |
| Frequency selective | PUCCH | PUSCH |

Referring to Table 2, a CQI may be transmitted using a PUCCH at a period determined in a higher layer or may be aperiodically transmitted using a PUSCH according to the necessity of a scheduler. The CQI can be transmitted using the PUSCH only in case of a frequency selective scheduling scheme and aperiodic CQI transmission. Hereinafter, a CQI transmission method according to a scheduling scheme and periodicity will be described.

1) CQI/PMI/RI Transmission Through PUSCH After Receiving CQI Transmission Request Control Signal (CQI Request)

A control signal for requesting CQI transmission may be included in a PUSCH scheduling control signal (UL grant) transmitted through a PDCCH. The following Table 3 shows a UE mode when a CQI, a PMI, and an RI are transmitted through the PUSCH.

TABLE 3

| | | PMI Feedback Type | | |
|---|---|---|---|---|
| | | No PMI | Single PMI | Multiple PMIs |
| PUSCH CQI Feedback Type | Wideband (wideband CQI) | | | Mode 1-2 |
| | UE selected (subband CQI) | Mode 2-0 | | Mode 2-2 |
| | Higher layer configured (subband CQI) | Mode 3-0 | Mode 3-1 | |

The transmission mode of Table 3 is selected in a higher layer and the CQI/PMI/RI are transmitted in the same PUSCH subframe. Hereinafter, a UL transmission method of a UE according to each mode will be described.

Mode 1-2 indicates the case of selecting a precoding matrix under the assumption that data for each subband is transmitted only through the subband. A UE generates a CQI under the assumption of a selected precoding matrix with respect to a system band or a designated band (set S) in a higher layer. In Mode 1-2, the UE may transmit a CQI and a PMI value of each subband. In this case, the size of each subband may differ according to the size of the system band.

A UE in Mode 2-0 may select M preferred subbands with respect to a system band or a set S designated in a higher layer. The UE may generate one CQI value under the assumption that data is transmitted with respect to the M selected subbands. Additionally, the UE desirably reports one CQI (wideband CQI) value with respect to the system band or the set S. If multiple codewords are present with respect to the M selected subbands, the UE defines CQI values for the respective codewords as a differential format.

At this time, the differential CQI value is determined by a difference value between an index corresponding to a CQI value for the M selected subbands and an index of a wideband CQI.

The UE in Mode 2-0 may transmit information about locations of the M selected subbands, one CQI value for the M selected subbands, and a CQI value generated for all bands or a designated band (set S) to a BS. In this case, the size of a subband and the M value may differ according to the size of a system band.

A UE in Mode 2-2 may simultaneously select the locations of M preferred subbands and a single precoding matrix for the M preferred subbands under the assumption that data is transmitted through the M preferred subbands. A CQI value for the M preferred subbands is defined with respect to each codeword. Moreover, the UE additionally generates a wideband CQI value for a system band or a designated band (set S).

A UE in Mode 2-2 may transmit information about the locations of M preferred subbands, one CQI value for the M selected subbands, one PMI for the M selected subbands, a wideband PMI, and a wideband CQI value to a BS. In this case, the size of a subband and the M value may differ according to the size of a system band.

A UE in Mode 3-0 generates a wideband CQI value. The UE generates a CQI value for each subband under the assumption that data is transmitted through each subband. Even if RI>1, the CQI value indicates only a CQI value for the first codeword.

A UE in Mode 3-1 generates a single precoding matrix with respect to a system band or a designated band (set S). The UE generates a subband CQI per codeword under the assumption of the above generated single precoding matrix with respect to each subband. The UE may also generate a wideband CQI under the assumption of a single precoding matrix. A CQI value of each subband may be expressed in a differential format. A subband CQI value is calculated by the difference between a subband CQI index and a wideband CQI index. The size of a subband may differ according to the size of a system band.

2) Periodic CQI/PMI/RI Transmission Through PUCCH

A UE may periodically transmit a control signal (e.g. CQI/PMI/RI information) to a BS through a PUCCH. Upon receiving a control signal commanding transmission of user data, the UE may transmit a CQI to the BS through a PUSCH. Even though the control signal is transmitted through the PUSCH, CQI/PMI/RI may be transmitted by one scheme among modes defined in the following Table 4.

TABLE 4

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE selected (subband CQI) | Mode 2-0 | Mode 2-1 |

The UE may have a transmission mode as shown in Table 4. Referring to Table 4, in Mode 2-0 and Mode 2-1, a Bandwidth Part (BP) is a set of subbands contiguously located in a frequency domain and may cover both a system band and a designated band (set S). In Table 4, the size of each subband, the size of a BP, and the number of BPs may vary with the size of a system band. The UE transmits a CQI per BP in the frequency domain in an ascending order so as to cover the system band or the designated band (set S).

The UE may have the following four transmission types according to transmission combinations of CQI/PMI/RI.

i) First type (Type 1): A subband CQI (SB-CQI) of Mode 2-0 and Mode 2-1 is transmitted.

ii) Second type (Type 2): A wideband CQI and PMI (WB-CQI/PMI) are transmitted.

iii) Third type (Type 3): An RI is transmitted.

iv) Fourth type (Type 4): A wideband CQI is transmitted.

When the UE transmits an RI and a CQI/PMI, the RI and the CQI/PMI are transmitted in subframes having different periods and offsets. If both the RI and the CQI/PMI should be transmitted in the same subframe, the CQI/PMI is not transmitted.

In Table 4, a transmission period of a wideband CQI/PMI and a subband CQI is P and the CQI/PMI and subband CQI have the following characteristics.

The wideband CQI/PMI has a period of H*P where H=J*K+1, J denotes the number of BPs, and K denotes the number of all cycles of BPs. Namely, the UE transmits the wideband CQI/PMI at {0, H, 2H, . . . }.

The subband CQI is transmitted at a time J*K other than a time for transmitting the wideband CQI/PMI.

In Table 4, the transmission period of the RI is M times the period of the wideband CQI/PMI and the RI and wideband CQI/PMI have the following characteristics.

The offset of the RI and wideband CQI/PMI is O. If the RI and the wideband CQI/PMI are transmitted in the same subframe, the wideband CQI/PMI is not transmitted.

Parameters P, H, K, and O described above are determined by a higher layer and are signaled to a physical layer of the UE.

Hereinafter, a feedback operation according to a UE mode will be described. If the UE is in Mode 1-0 and transmits an RI to the BS, the UE generates the RI with respect to a system band or a designated band (set S) and transmits a third type report for transmitting the RI to the BS. In the case of CQI transmission, the UE transmits a wideband CQI.

If the UE is in Mode 1-1 and transmits an RI to the BS, the UE generates the RI with respect to a system band or a designated band (set S) and transmits the third type report for transmitting the RI to the BS. During transmission of CQI/PMI, the UE selects a single precoding matrix in consideration of a latest transmitted RI. That is, the UE transmits a second type report including a wideband CQI, a single precoding matrix, and a differential wideband CQI to the BS.

If the UE is in Mode 2-0 and transmits an RI, the UE generates the RI with respect to a system band or a designated band (set S) and transmits the third type report for transmitting the RI to the BS. During transmission of a wideband CQI, the UE generates the wideband CQI under the assumption of a latest transmitted RI and transmits a fourth type report to the BS. Upon transmitting a CQI for a selected subband, the UE selects the most preferred subband with respect to J BPs including N subbands and transmits a first type report to the BS. The first type report may be transmitted through one or more subframes according to a BP.

If the UE is in Mode 2-1 and transmits an RI, the UE generates the RI with respect to a system band or a designated band (set S) and transmits the third type report for transmitting the RI to the BS. During transmission of a wideband CQI, the UE generates the wideband CQI under the assumption of a latest transmitted RI and transmits the fourth type report to the BS. In case of a CQI for selected subbands is transmitted, the UE generates a single CQI value for subbands selected in BPs in consideration of a latest transmitted PMI/RI with respect to j BPs including Nj subbands and a CQI difference between codewords under the assumption that the latest transmitted RI and a single precoding matrix for the selected subbands are used when the RI is greater than 1 and transmits the first type report to the BS.

3. Multicarrier Environment

A communication environment considered in the embodiments of the present invention includes a multicarrier support environment. That is, a multicarrier system or a carrier aggregation system used in the present invention refers to a system configuring a wideband by aggregating more than one carrier having a bandwidth narrower than a target bandwidth for wideband support.

In the present invention, multicarrier refers to carrier aggregation and carrier aggregation includes non-contiguous carrier aggregation as well as contiguous carrier aggregation. In addition, the term carrier aggregation is used interchangeably with the term bandwidth aggregation etc.

In an LTE-A system, multicarrier (i.e. carrier aggregation) configured by combining two or more CCs is designed for supporting up to 100 MHz. When one or more carriers having a narrower bandwidth than a target bandwidth are aggregated, the bandwidth of the aggregated carriers may be limited to a bandwidth used in a legacy system in order to maintain backward compatibility with a legacy IMT system.

For example, a 3GPP LTE system (LTE R-8 system) may support bandwidths of {1.4, 3, 5, 10, 15, 20} MHz and a 3GPP LTE-Advanced system (i.e. LTE-A system) may support a bandwidth wider than 20 MHz using the above bandwidths supported by the LTE system. In addition, a multicarrier system used in the present invention may define a new bandwidth irrespective of a bandwidth used in a legacy system to support carrier aggregation.

Figure 7:
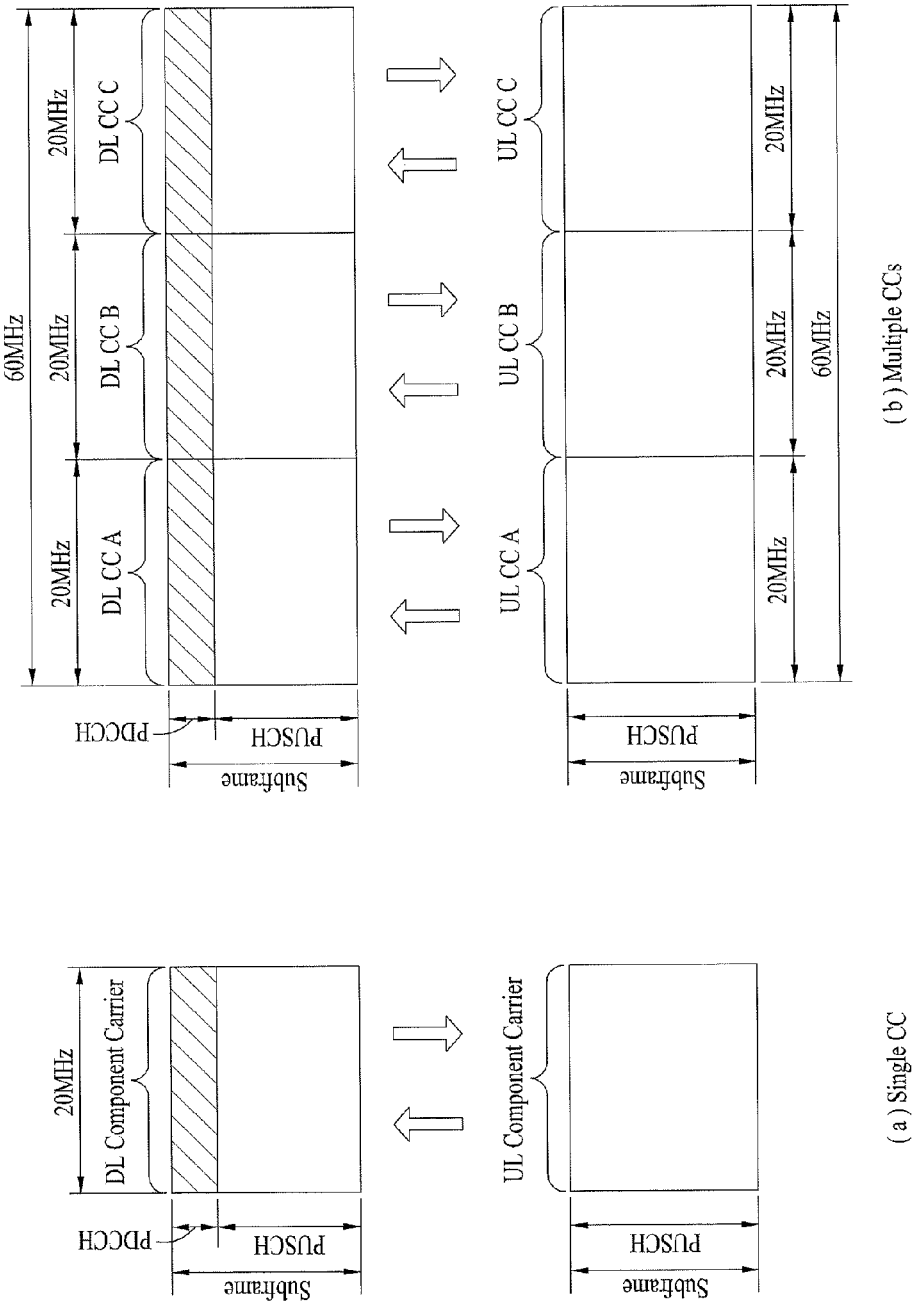
FIG. 7 is a diagram illustrating an example of a CC used in an LTE system and multiple carriers (carrier aggregation) used in an LTE-A system.

FIG. 7 is a diagram illustrating an example of a CC used in an LTE system and multiple carriers (carrier aggregation) used in an LTE-A system.

FIG. 7($a$) shows a single carrier structure used in the LTE system. A CC includes a DL CC and a UL CC. One CC may have a frequency range of 20 MHz.

FIG. 7($b$) shows a multicarrier structure used in the LTE-A system. In the illustrated case of FIG. 7($b$), three CCs each having a frequency bandwidth of 20 MHz are aggregated. In multicarrier aggregation, a UE may simultaneously monitor three CCs and may receive DL signal/data or transmit UL signal/data.

If N DL CCs are managed in a specific e-NodeB (eNB), a network may allocate M (M≤N) DL CCs to a UE. The UE may monitor only the M limited DL CCs and receive a DL signal. The network may allocate L (L≤M≤N) DL CCs to the UE according to priority. In this case, the UE should necessarily monitor the L DL CCs. This scheme may also be applied to UL transmission.

The LTE-A system uses the concept of a cell to manage radio resources. The cell is defined as a combination of a DL resource and a UL resource and the UL resource may be selectively defined. For example, the cell may be configured by the DL resource alone or by the DL resource and the UL resource. When multicarrier (i.e. carrier aggregation) is supported, the linkage between the carrier frequency of the DL resource (or DL CC) and the carrier frequency of the UL resource (or UL CC) may be indicated by system information. Namely, one cell is comprised of one or more DL CCs and may selectively include one or more UL CCs.

The concept of a cell used in the LTE-A system includes a Primary cell (PCell) and a Secondary cell (SCell). The PCell may refer to a cell operating on a primary frequency (or primary CC) and the SCell may refer to a cell operating on a secondary frequency (or secondary CC). Notably, only one PCell and one or more SCells may be allocated to a specific UE.

The PCell is used to perform an initial connection establishment procedure or a connection re-establishment procedure. The PCell may refer to a cell indicated during a handover procedure. The Scell can be configured after RRC_CONNECTED is established and may be used to provide additional radio resources.

The PCell and SCell may be used as a serving cell. In the case of a UE in which carrier aggregation is not configured or carrier aggregation is not supported even in an RRC_CONNECTED state, only a single serving cell comprised of only a PCell is present. Meanwhile, in the case of a UE in which carrier aggregation is configured in an RRC_CONNECTED state, one or more serving cells may be present and all cells include a PCell and one or more Scells.

After an initial security activation procedure is started, an E-UTRAN may configure a network including one or more SCells in addition to an initially configured PCell during a connection establishment procedure. In a multicarrier environment, each of a PCell and an SCell may serve as a CC. Namely, carrier aggregation may be understood as a combination of a PCell and one or more SCells. In the following embodiments, a Primary CC (PCC) may have the same meaning as a PCell and a Secondary CC (SCC) may have the same meaning as an SCell.

Figure 8:
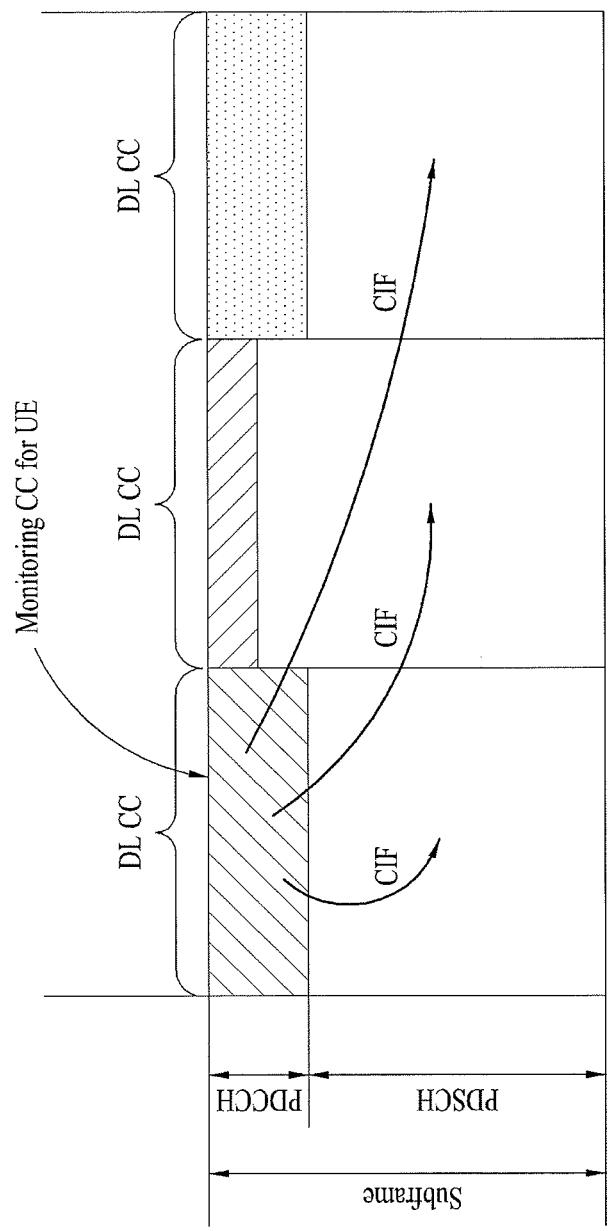
FIG. 8 is a diagram illustrating an exemplary cross-CC scheduling method which can be used in the present invention.

FIG. 8 is a diagram illustrating an exemplary cross-CC scheduling method which can be used in the present invention.

A PDCCH structure and DCI format defined in LTE Rel-8 specification do not support cross-CC scheduling. In other words, the DCI format and PDCCH transmission structure (the same coding method and the same CCE based resource mapping) of LTE Rel-8 are used. For example, a PDCCH on a CC allocates PDSCH resources to the same CC and allocates PUSCH resources to a linked UL CC. In this case, a Carrier Indicator Field (CIF) is not necessary. In addition, related PDSCH transmission and UL A/N, PUSCH transmission, and PHICH transmission methods conform to LTE Rel-8 specification.

A PDCCH structure and DCI format defined in LTE-A specification may support cross-CC scheduling That is, a PDCCH (DL grant) and a PDSCH may be transmitted on different DL CCs or a PUSCH transmitted according to a PDCCH (UL grant) transmitted on a DL CC may be transmitted through a UL CC other than a UL CC linked with the DL CC receiving the UL grant.

In this case, a PDCCH requires a CIF indicating through which DL/UL CC a PDSCH/PUSCH indicated by the PDCCH is transmitted. For example, the PDCCH may allocate a PDSCH or PUSCH resource to one of a plurality of CCs using a CIF. To this end, a DCI format of the LTE-A system may be extended according to a 1-bit or 3-bit CIF and may reuse the PDCCH structure of LTE Rel-8.

Whether cross-CC scheduling is permitted may be determined UE-specifically, UE-group specifically, or cell-specifically. Signaling overhead can be reduced by semi-statically toggling operation of cross-CC operation.

In this way, the size of a CIF according to permission/non-permission of cross-CC scheduling, i.e. activation/deactivation of cross-CC scheduling may be semi-statically set. This is similar to the case in which a UE specific transmission mode is semi-statically determined in LTE Rel-8. However, the size of a CIF may be fixed at 3 bits according to a communication environment and the location of the CIF may be fixed regardless of the size of a DCI format.

If cross-CC scheduling is deactivated, this means that a PDCCH monitoring set is always the same as a UE DL CC set. In this case, an indication such as additional signaling for the PDCCH monitoring set is not necessary. If cross-CC scheduling is activated, the PDCCH monitoring set is desirably defined in the UE DL CC set and, at this time, an indication such as additional signaling for the PDCCH monitoring set is necessary.

When a CIF is present, an eNB may allocate a DL CC set for monitoring PDCCHs in order to reduce the number of blinding decoding operations of a UE. The DL CC set may be a part of all aggregated DL CCs and the UE can detect and decode the PDCCHs only in the allocated DL CC set. That is, the eNB can transmit PDCCHs only through the DL CC monitoring set to schedule the PDSCH and PUSCH for the UE. The PDCCH DL CC monitoring set may be configured UE-specifically, UE group-specifically, or cell-specifically.

Referring to FIG. 8, for example, three DL CCs are aggregated in a DL subframe with respect to an LTE-A UE. DL CC A may include a PDCCH monitoring DL CC. If a CIF is disabled, a PDCCH and a PDSCH are transmitted through the same DL CC scheduled according to an LTE Rel-8 rule. If the CIF is enabled, the PDCCH may be transmitted through the monitoring DL CC A and the PDSCH may be transmitted through DL CC B and DL CC C as well as DL CC A. Notably, the PDCCH cannot be transmitted through DL CC B and DL CC C other than the DL CC monitoring set.

4. CSI Transmission Method for Multiple Serving Cells

Hereinafter, a CSI transmission method for multiple cells as an embodiment of the present invention will be described in detail.

If two or more serving cells are allocated to a UE, the UE may be semi-statically configured by a higher layer so as to periodically feedback CSI on a PUCCH. The CSI may include a CQI, a PMI, an RI, and/or a Precoding Type Indicator (PTI).

In an LTE Ranjdiel-8 system, a CSI type transmitted from the UE is classified into an RI, a wideband CQI (WB-CQI)/PMI, and a subband CQI (SB-CQI) as shown in Table 5. Table 5 shows CSI types transmitted by the UE in the LTE-A system according to each case. Order of CQI transmission periods according to each type is RI>WB-CQI/PMI>SB-CQI.

TABLE 5

|  | LTE Rel-8 | LTE-A | | | | | | | |
|  |  | Case #1 | Case #2 | Case #3 | Case #4 | Case #5 | Case #6 | Case #7 | Case #8 |
| --- | --- | --- | --- | --- | --- | --- | --- | --- | --- |
| CSI Type 1 | RI | RI | L-PMI | RI/L-PMI | RI | L-PMI | RI/L-PMI | RI | L-PMI |
| CSI Type 2 | WB-CQI/PMI | L-PMI | RI | WB-CQI/S-PMI | L-PMI | RI | WB-CQI | WB-CQI/L-PMI | WB-CQI/RI |
| CSI Type 3 | SB-CQI | WB-CQI/S-PMI | WB-CQI/S-PMI | SB-CQI | WB-CQI | WB-CQI | SB-CQI/S-PMI | SB-CQI/S-PMI | SB-CQI/S-PMI |
| CSI Type 4 |  | SB-CQI | SB-CQI |  | SB-CQI/S-PMI | SB-CQI/S-PMI |  |  |  |

Referring to Table 5, the present invention may use a Long-term PMI (L-PMI) and a Short-term PMI (S-PMI) in order to improve performance through Cooperative Multi-Point (CoMP) between cells considering more precise channel adaptation than in LTE Rel-8 and intercell interference. It is assumed that the transmission period of the L-PMI is longer than the transmission period of the S-PMI. The L-PMI may be referred to as a first PMI and the S-PMI may be referred to as a second PMI.

The CSI type for LTE-A considering the L-PMI and S-PMI may be applied based on a specific case among the possible cases proposed in Table 5. In Table 5, a transmission period of N type CSI is longer than a transmission period of N+1 type CSI. It is assumed in the present invention that the N type CSI has higher priority than the N+1 type CSI. Namely, high priority may be allocated to CSI having a long transmission period. It is also assumed that the CSI type and the number of CSI for CSI transmission of each DL CC based on a specific case are independently configured according to each DL CC. Hereinafter, a description will be given under the assumption that Case #1 in Table 5 is applied for convenience of description.

Since a plurality of CCs is aggregated in an LTE-A system, CSI for the plurality of CCs needs to be transmitted to an eNB from a UE. That is, the UE should transmit CSI for one or more serving cells to the eNB. When the UE considers periodic CSI transmission through a control channel (e.g. PUCCH), configuration information for CSI transmission of the multiple DL CCs, (e.g. a CSI transmission period, CSI transmission mode, and/or a CSI type), may be identically set with respect to all serving cells (e.g. DL CCs) or each serving cell group or may be independently set with respect to each serving cell. Also, PUCCH indexes for CSI transmission of multiple serving cells may be identically set with respect to all serving cells or each serving cell group or may be independently set with respect to each serving cell.

In order to reduce distortion of a power amplifier during UL transmission of a UE in addition to Rel-8 and LTE-A systems, a single carrier property needs to be maintained with respect to a UL transmission signal. To this end, it is necessary to define a UE behavior for maintaining a single carrier property of a UL transmission signal when a plurality of PUCCHs should be transmitted through the same subframe.

Hereinafter, a UE UL behavior for CSI transmission for multiple serving cells (DL CCs) in a multicarrier aggregation environment will be described. For example, a method for transmitting one piece of control information (i.e. CSI) through one PUCCH is provided when CSI transmission for a plurality of DL CCs is simultaneously needed through a plurality of PUCCHs or PUSCHs in a specific subframe. In addition, a CSI drop method according to CSI priority is disclosed so that only specific CSI among plural pieces of CSI can be transmitted. For example, a method for dropping a CQI for each serving cell according to serving cell type, CSI transmission period, and/or CSI type is described in accordance with embodiments of the present invention.

In the embodiments of the present invention, the term CC is used interchangeably with the term cell as described earlier. In other words, a serving cell basically includes one or more DL CCs and, in some cases, includes UL CCs. In addition, one serving cell may include one DL CC and/or a UL CC.

Figure 9:
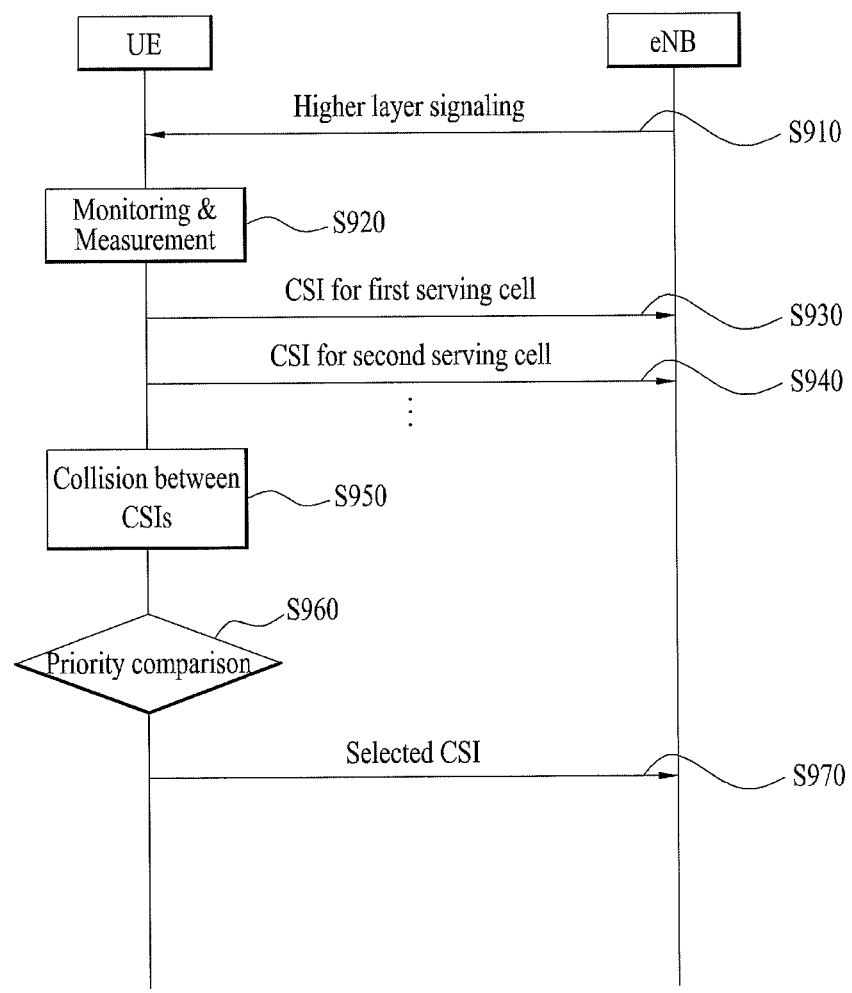
FIG. 9 is a diagram illustrating a CSI report method according to priority of CSI in accordance with an embodiment of the present invention.

FIG. 9 is a diagram illustrating a CSI report method according to priority of CSI in accordance with an embodiment of the present invention.

Hereinbelow, a method will be described for differently configuring the contents of CSI for serving cells by independently configuring CSI transmission and feedback mode for each serving cell (e.g. DL CC) according to an embodiment of the present invention. Namely, the contents of CSI may be comprised of one or more CSI reporting types. The CSI reporting type may be generated in association with a PUCCH format.

An eNB controls time and frequency resources capable of being used for CSI reporting. According to the embodiments of the present invention, CSI may include one or more of a CQI, PMIS (e.g., first PMI and a second PMI), and an RI.

If one or more serving cells are allocated to a UE, the UE may periodically transmit CSI to all activated serving cells. The UE may obtain information about CSI reporting modes for one or more serving cells through higher layer signaling. The UE may obtain one or more transmission periods and offset values of the CQI, PMI, PTI, and RI through higher layer signaling (S910).

The UE may communicate with the eNB through one or more serving cells and may monitor and measure states of DL channels (S920).

The UE may report CSI for one or more activated serving cells to the eNB at transmission periods according to the contents of the CSI. In other words, the UE transmits CSI of a first serving cell and CSI of a second serving cell to the eNB at each CSI transmission period (S930 and S940).

If the UE is in a simultaneous transmission mode of PUSCH and PUCCH signals in steps S930 and S940, the UE may periodically report each piece of CSI to the eNB through a PUCCH. If the UE is not in a simultaneous transmission mode of PUSCH and PUCCH signals, the UE may periodically report CSI to the eNB through a PUSCH by piggybacking the CSI on the PUSCH signal.

Notably, transmission periods of CSI may overlap in the same subframe while the UE reports the CSI for each serving cell to the eNB. Namely, pieces of CSI to be transmitted in a specific subframe by the UE may collide with each other (S950).

According to the embodiments of the present invention, if CSI reports for two or more serving cells overlap in the same subframe, CSI only for one serving cell may be transmitted. Accordingly, the UE may compare priorities of CSI reporting types related to a PUCCH format (S960), select CSI having a high priority to report the CSI to the eNB, and drop CSI for the other cells (S970).

Priorities of CSI reporting types may be determined in consideration of a cell type, a CSI reporting period, a CSI reporting type, a UE transmission mode, CSI reporting mode, and/or a PUCCH format. In the CSI reporting type, transmission periods and offsets may be determined according to a PUCCH CSI reporting mode.

The case in which the UE drops CSI according to priority of a CSI reporting type will be described below. The CSI reporting type indicates CSI according to CSI reporting mode and is used to support the CSI reporting mode. It is assumed in Table 5 that CSI Type 1 has the highest priority of a CSI reporting type and CSI Type 4 has the lowest priority of a CSI reporting type.

Referring to Table 5, in Case #3, CSI Type 1 indicates that the UE reports an RI and a first PMI (L-PMI) to the eNB (i.e. CSI reporting type 5). CSI Type 2 indicates that the UE reports a WB-CQI and a second PMI (S-PMI) to the eNB (i.e. CSI reporting type 2b). CSI Type 3 indicates that the UE reports an SB-CQI to the eNB (i.e. CSI reporting type 1).

In Case #6, CSI Type 1 indicates that the UE reports an RI and a first PMI (L-PMI) to the eNB (i.e. CSI reporting type 5). CSI Type 2 indicates that the UE reports a WB-CQI to the eNB (i.e. CSI reporting type 4). CSI Type 3 indicates that the UE reports an SB-CQI and a second PMI (S-PMI) to the eNB (i.e. CSI reporting type 1a).

In Case #7, CSI Type 1 indicates that the UE reports an RI to the eNB (i.e. CSI reporting type 3). CSI Type 2 indicates that the UE reports a WB-CQI and a first PMI (L-PMI) to the eNB (i.e. CSI reporting type 2c). CSI Type 3 indicates that the UE reports an SB-CQI and a second PMI to the eNB (i.e. CSI reporting type 1a). As to the contents of CSI reports for the other cases, reference is made to Table 5.

If the UE should simultaneously transmit CSI Type 1 for a first serving cell and CSI Type 2 for a second serving cell in a predetermined subframe (i), the UE may drop CSI for CSI Type 2 having a lower priority and report only CSI for CSI Type 1 to the eNB because the priority of CSI Type 1 is higher than the priority of CSI Type 2.

If CSI of CSI Type 2 collides with CSI of CSI Type 3 in step S950, the UE may drop CSI for CSI Type 3 having a lower priority and report only CSI for CSI Type 2 to the eNB. Obviously, if CSI of CSI Type 1 collides with CSI of CSI Type 3, the UE may report only CSI for CSI Type 1 to the eNB and drop CSI for CSI Type 3 (S950 to S970).

Priorities according to CSI reporting type in Table 5 are as follows. A CSI reporting type 3 or 5 has a higher priority than a CSI reporting type 2b, 2c, or 4 and a CSI reporting type 2b, 2c, or 4 has a higher priority than a CSI reporting type 1 or 1a.

Accordingly, if CSI of the CSI reporting type 3 or 5 collides with CSI of the CSI reporting type 2b, 2c, or 4 in the same subframe, the UE drops the CSI of the CSI reporting type 2b, 2c, or 4 having a lower priority and transmits only the CSI of the CSI reporting type 3 or 5 to the eNB. In addition, if CSI of the CSI reporting type 2b, 2c, or 4 collides with CSI of the CSI reporting type 1 or 1a in the same subframe, the UE drops the CSI of the CSI reporting type 1 or 1a having a lower priority and transmits the CSI of the CSI reporting type 2b, 2c, or 4 to the eNB.

Figure 10:
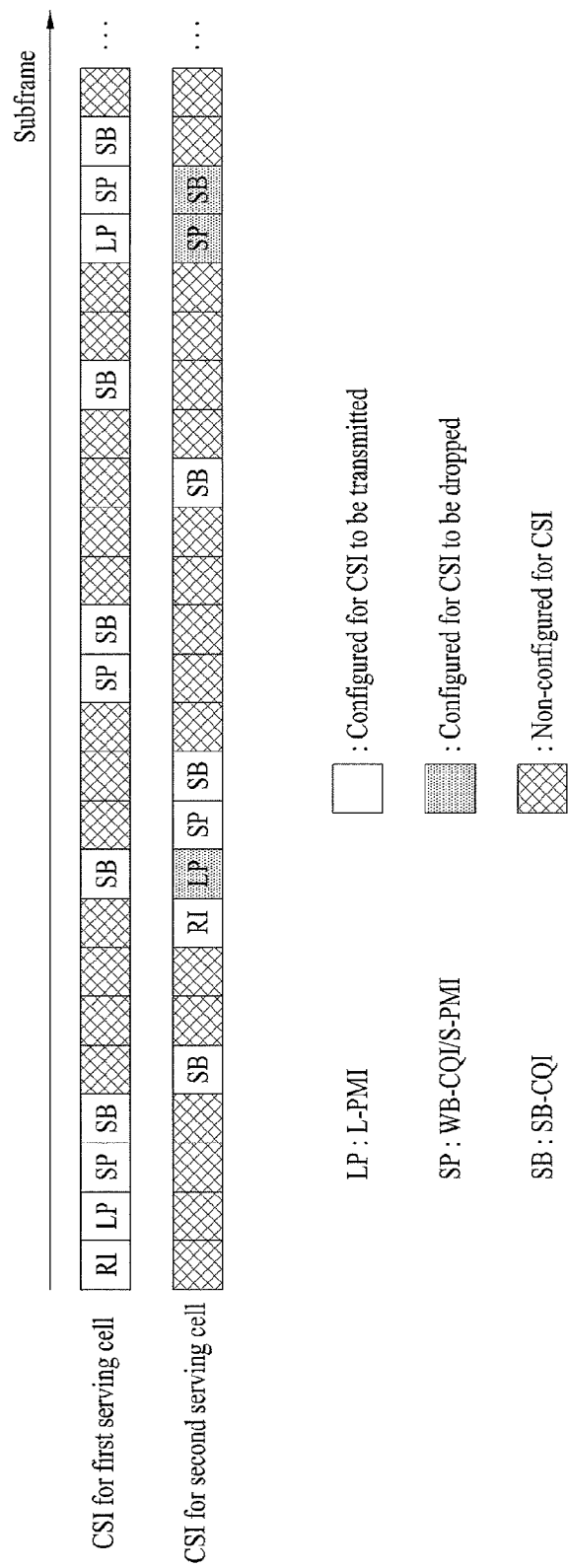
FIG. 10 is a diagram illustrating a CSI drop method according to cell type in accordance with an embodiment of the present invention.

FIG. 10 is a diagram illustrating a CSI drop method according to cell type in accordance with an embodiment of the present invention.

If the UE needs to transmit CSI for a plurality of serving cells (i.e. a plurality of DL CCs) during the same time duration, the UE may transmit only CSI for a PCell and may drop CSI for the other SCells according to cell type (i.e. CC type).

For stable system information transmission, control information transmission, and cross-CC scheduling, there is a high possibility that a serving cell having a good channel state among a plurality of serving cells is set as an anchor cell (i.e. anchor DL CC) or a PDCCH monitoring cell. In this case, the anchor cell or PDCCH monitoring cell may be set as a PCell. Moreover, DL data transmission may first be performed through the PCell.

In the embodiments of the present invention, a CSI report for the PCell (i.e. anchor DL CC or PDCCH monitoring DL CC) can be guaranteed first. In FIG. 9, DL CC #1 represents a PCell and DL CC #2 represents an SCell. It is assumed that transmission periods of CQI information such as RI, L-PMI, WB-CQI/S-PMI, and SB-CQI in the PCell are 40, 20, 10, and 5 ms, respectively and transmission periods of RI, L-PMI, WB-CQI/S-PMI, and SB-CQI in the SCell are 48, 24, 12, and 6 ms, respectively.

Referring to FIG. 10, transmission periods of CQIs of cells may overlap. In this case, the UE may transmit only CQI information for the PCell and drop CQI information for the SCells, thereby maintaining a single carrier property.

Figure 11:
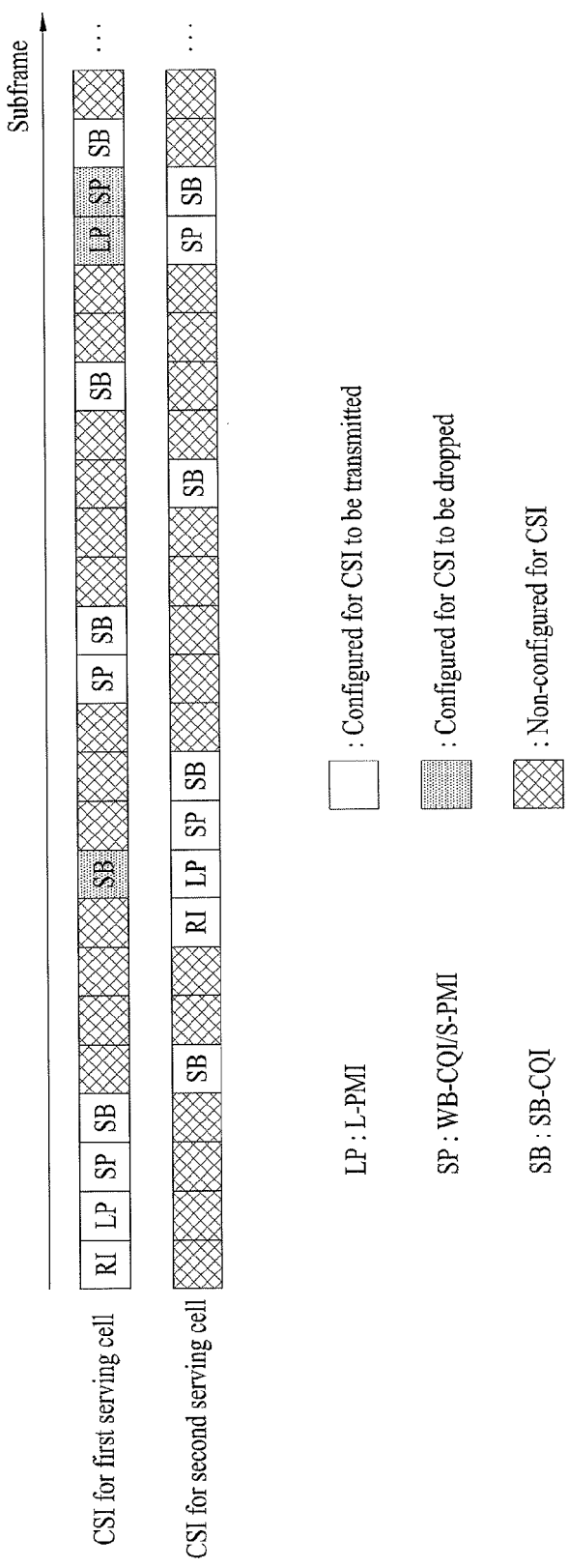
FIG. 11 is a diagram illustrating a CSI drop method according to a CSI reporting period in accordance with an embodiment of the present invention.

FIG. 11 is a diagram illustrating a CSI drop method according to a CSI reporting period in accordance with an embodiment of the present invention.

If the UE needs to transmit CSI for a plurality of serving cells (i.e. a plurality of DL CCs) in the same subframe, the UE may drop CSI according to CSI transmission period. Namely, the UE may first report least frequently used CSI out of CSI reported to the eNB and drop CSI for the other cells transmitted in the same subframe.

If an interval of a transmission time duration of CSI is significantly increased, a channel adaptation result according to a UE mobility change cannot be reliable. Accordingly, CSI having a long transmission period may first be transmitted in consideration of the transmission period of CSI.

For example, if CSI transmission for a plurality of serving cells is simultaneously needed in the same subframe, the UE may transmit only CSI for a cell having the longest transmission period of a CSI reporting mode and drop CSI having a relatively short transmission period. As to relative magnitude of a transmission period according to CQI type, reference may be made to Table 5.

If CSI transmission for a plurality of serving cells is simultaneously needed in the same subframe, the UE may transmit only CSI for a serving cell having the longest transmission period according to CSI reporting modes to be transmitted in the same subframe.

It is assumed in FIG. 11 that a first serving cell (DL CC #1) is a PCell and a second serving cell (DL CC #2) is an SCell. It is also assumed that transmission periods of CSI transmitted in the PCell and Scell are the same as transmission periods described with reference to FIG. 10. The UE may transmit only CSI for a serving cell having the longest transmission period according to CSI type and may drop the other CSI.

In FIG. 11, only CSI having the longest transmission period according to CSI type in Case #1 is transmitted. Referring to Table 5, the transmission period is in order of RI>L-PMI>WB-CQI/S-PMI>SB-CQI. If the transmission period of CQI information of the SCell is longer than that of the PCell even though CQI information is CQI information in the PCell (e.g. SB<LP, LP<SP, and SP<SB), the UE may transmit CSI of the SCell and drop CSI of the PCell.

Although the first serving cell is a PCell and the second serving cell is an SCell in FIG. 11, the first serving cell may be an SCell and the second serving cell may be a PCell.

Figure 12:
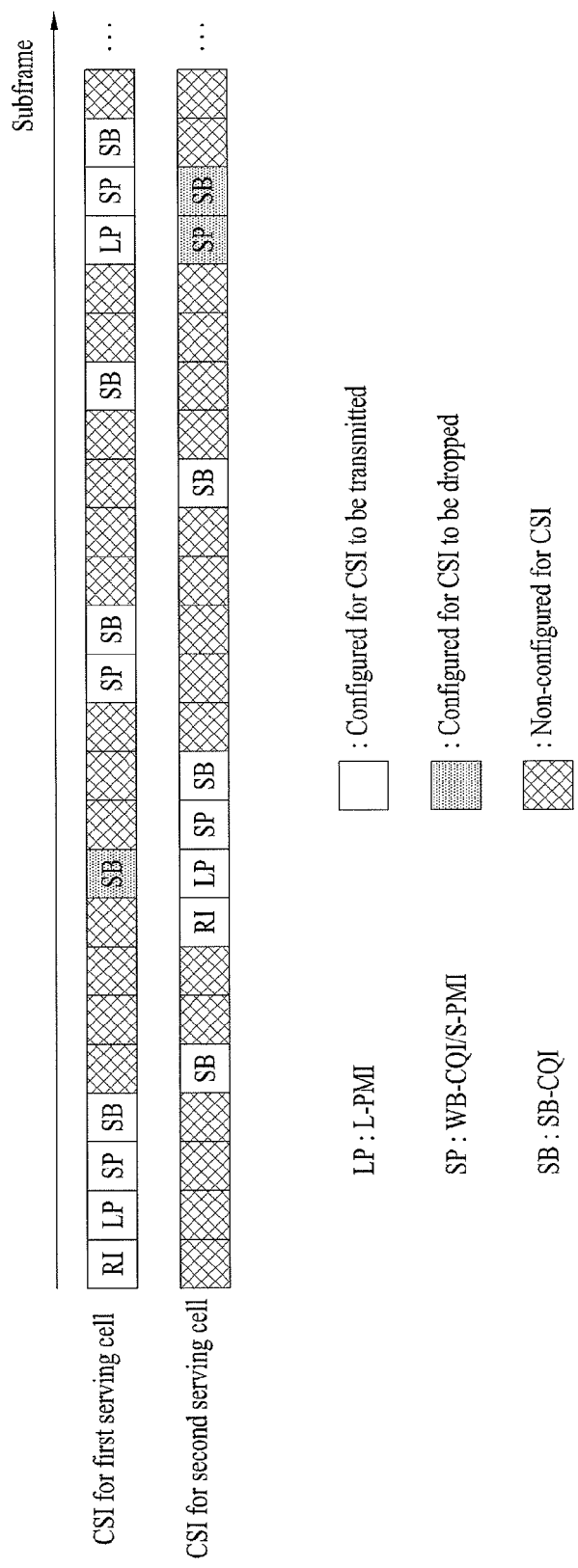
FIG. 12 is a diagram illustrating a CSI drop method according to a CSI type in accordance with an embodiment of the present invention.

FIG. 12 is a diagram illustrating a CSI drop method according to CSI type in accordance with an embodiment of the present invention.

If simultaneous transmission of two or more CSIs for a plurality of serving cells is needed, the UE may drop CSI according to CSI type. CSI configuration may be independently set according to a serving cell (e.g. DL CC). Therefore, the numbers of CSI types, M, configured in respective cells may be the same or different. For example, when Case #1 of Table 5 is applied, all four CQI types of RI, L-PMI, WB-CQI/S-PMI, and SB-CQI may be set for a PCell (DL CC #1) and three CSI types of RI, L-PMI, and WB-CQI/S-PMI may be set for an SCell (DL CC #2). Hereinafter, a CSI transmission method of a UE will be described when the number of CSI types, M, is the same.

In the embodiment of the present invention, a CSI type having a low priority (i.e. a short period) may be determined depending upon a CSI type having a high priority (i.e. long period). In other words, the priority of CSI transmission may differ according to CSI type. Assuming that Case #1 in Table 5 is applied, a rank (i.e. RI) is first determined and then an L-PMI may be determined only in a long-term precoding codebook. In this case, an S-PMI is determined in a short-term precoding codebook specified (e.g. precoder-transformed or subset restricted) by the determined L-PMI and a WB-CQI and an SB-CQI may be determined depending on the S-PMI. Accordingly, determination of a CSI type having a low priority is meaningful only when a CSI type having a high priority is predetermined.

In FIG. 12, a method for first ensuring CSI transmission for a DL CC having the highest priority of a CSI type is shown in consideration of the above description. It is assumed in FIG. 12 that the same number of CSI types (i.e. M=4) is set for a PCell (DL CC #1) and an SCell (DL CC #2). It is also assumed that a transmission period of each CSI type is the same as that described with reference to FIG. 10.

Referring to FIG. 12, if CSI report times for two serving cells (DL CC #1 and DL CC #2) are the same, the UE transmits only CSI for a cell having the highest priority of a CSI type to be transmitted in the same subframe. Namely, if one or more serving cells are allocated to the UE and CSI for two or more serving cells should be transmitted in the same subframe, the UE may transmit CSI only for a serving cell having a high priority and drop CSI for the other cells.

For example, since first type CSI has a higher priority than other types of CSI, the UE may transmit only the first type CSI and drop the other CSI. Referring to FIG. 12, when an SB-CQI (SB) is transmitted in a PCell and an L-PMI (LP) is transmitted in an SCell in the same subframe, since the CSI type (#2) of the LP is lower than the CSI type (#4) of the SB in Case #1, the UE transmits only the LP and may drop the SB. In addition, since the CSI type of an SP (WB-CQI/S-PMI) is lower than the CSI type of the SB, the UE transmits only the SP and may drop the SB-CQI.

Figure 13:
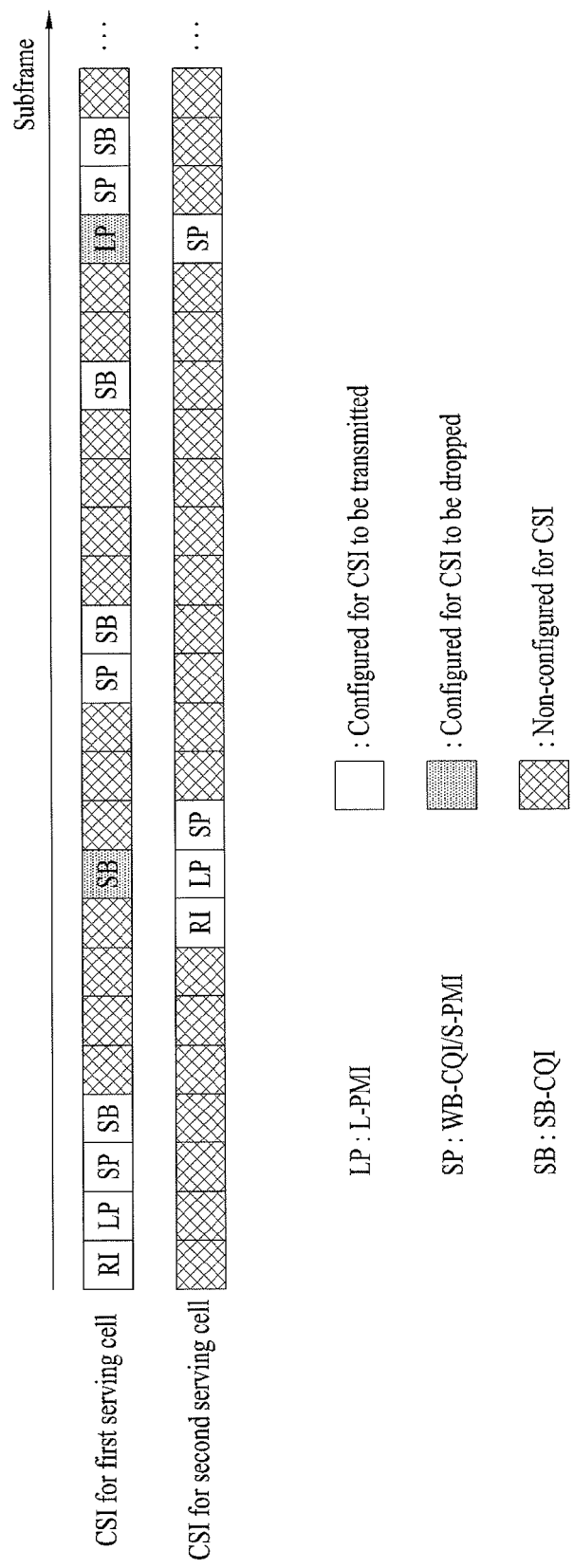
FIG. 13 is a diagram illustrating another CSI drop method according to CSI type in accordance with an embodiment of the present invention.

FIG. 13 is a diagram illustrating another CSI drop method according to CSI type in accordance with an embodiment of the present invention.

If simultaneous transmission of CSI for a plurality of serving cells is needed, the UE may drop CSI according to CSI type. CSI may be independently configured according to a serving cell (e.g. DL CC). Therefore, the numbers of CSI types, M, configured in respective cells may be the same or different. Hereinafter, a CSI transmission method of a UE will be described when the numbers of CSI types, M, are the different.

In FIG. 13, the number of CSI types for a PCell (DL CC #1), M, is 4 and a transmission period of each CSI type is the same as that in FIG. 10. Notably, the number of CSI types for an SCell (DL CC #2), M, is 3 and CSI includes RI, L-PMI, WB-CQI/S-PMI. It is assumed that transmission periods of RI, L-PMI, and WB-CQI/S-PMI in the SCell are 48, 24, and 12 ms, respectively. In FIG. 13, the UE may transmit only CSI for a cell having a least number of CSI types. That is, since the number of CSI types in the PCell is 4 and the number of CSI types in the SCell is 3, the UE may transmit only CQI information of the Scell when CSI of the Scell and CSI of the PCell are transmitted in the same subframe.

In the illustrated case of FIG. 13, the UE transmits only CSI for a serving cell having a least number of CQI types to the eNB. However, even though M values are different, the UE may transmit specific CSI according to a priority of a CSI type and drop the other CSI as described with reference to FIG. 12.

If an RI or L-PMI is included in a CSI type to be transmitted in the same subframe, the UE may operate as shown in FIG. 12 and, otherwise, the UE may transmit only CSI for a serving cell having the smallest M value as shown in FIG. 13.

Alternatively, the UE may transmit only CSI for a serving cell having the largest M value as opposed to FIG. 13. In this case, the UE may transmit only CSI of the PCell in FIG. 13.

If an RI or L-PMI is included in a CSI type to be transmitted in the same subframe, the UE may operate as shown in FIG. 12 and, otherwise, the UE may transmit only CSI for a serving cell having the largest M value.

Therefore, when M values are different, a CSI drop method may be selectively applied according to activation/deactivation of frequency-selective scheduling and dependency for a serving cell. In addition, transmission for a CSI type having a high priority such as an RI or L-PMI can be guaranteed regardless of an M value.

5. PHICH Allocation Method (1) PHICH Allocation Method in LTE Rel-8 System

Figure 14:
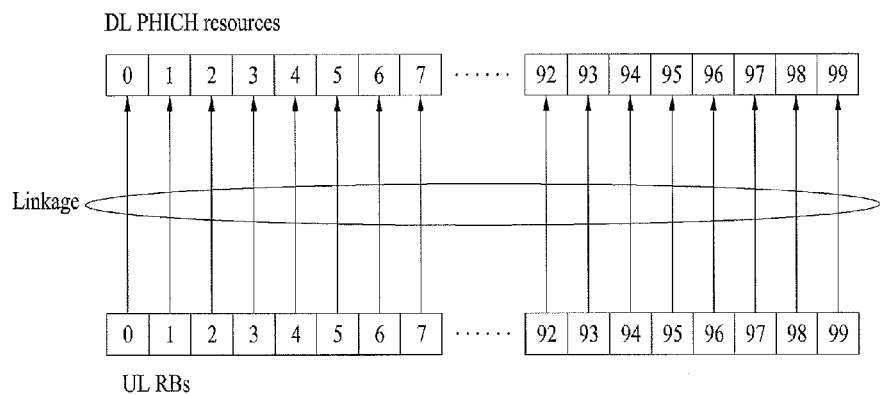
FIG. 14 is a diagram illustrating the linkage between 100 UL RBs and 100 DL PHICH resources which can be referred to in embodiments of the present invention.

In an LTE Rel-8 system, ACK/NACK feedback for UL data transmission through a PUSCH is transmitted through a DL PHICH resource. Multiple PHICH resources are distinguished by a combination of time, frequency, orthogonal code including different cyclic shifts, and/or I/Q phase domains. For transmission of each PUSCH signal, a PHICH resource used for ACK/NACK feedback corresponding to the PUSCH signal is determined based on a UL Resource Block (RB) of the first slot in which the PUSCH signal is transmitted. That is, all indexes of UL RBs are linked with all PHICH resources. FIG. 14 is a diagram illustrating the linkage between 100 UL RBs and 100 DL PHICH resources.

For ACK/NACK transmission for PUCCH transmission, a PHICH resource linked with an index of a UL RB having the least frequency among UL RBs used for PUSCH transmission is used. Namely, a PHICH resource linked with a lowest RB index used for PUSCH transmission is selected for ACK/NACK feedback. However, in an LTE Rel-8 system, there is no definition for the linkage between PHICH resources and the UL RBs added by application of a carrier aggregation technique. Further, in a predefined linkage relationship between PHICH resources and UL RBS, a PHICH resource used for PUSCH transmission may be adjusted by an offset value signaled by a higher layer and additional configuration.

(2) PHICH Allocation Method in LTE-A System

In the embodiment of the present invention, it is considered even in UL that plural (e.g. two) non-contiguous frequency resources (e.g. RBs or RB groups) are allocated to one UE in order to raise frequency resource usage efficiency, instead of allocating only contiguous frequency resources to one UE.

A UE used in the present invention can support UL multi-antenna transmission (i.e. UL MIMO) for high-speed large-capacity data transmission through UL and UL non-contiguous Resource Allocation (RA) can be applied during such UL MIMO transmission.

When two codewords (CWs) are transmitted through UL MIMO, the UE requires two PHICH resources (indexes) to transmit ACK/NACK for each CW. In the embodiments of the present invention, methods for allocating two PHICH resources considering application of UL non-contiguous RA are disclosed when the UE performs UL MIMO transmission.

FIGS. 15 to 19 are diagrams illustrating exemplary PHICH resource allocation methods in accordance with embodiments of the present invention.

Figure 15:
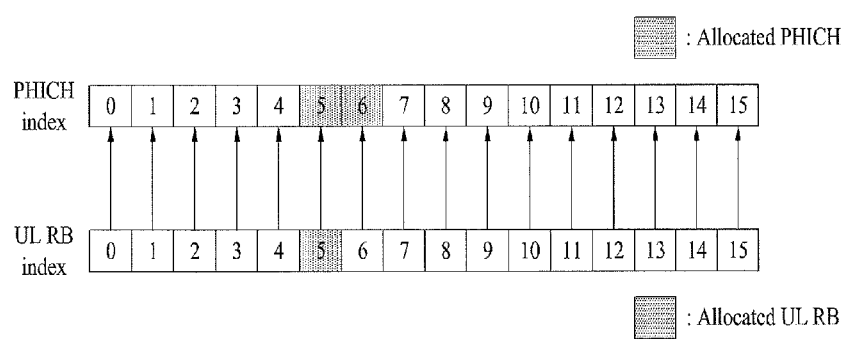
FIGS. 15 to 19 are diagrams illustrating exemplary PHICH resource allocation methods in accordance with embodiments of the present invention.

Referring to FIG. 15, if one RB is allocated to a UE for PUSCH transmission, two PHICH resources linked to an allocated RB index (nRB) and an RB index (nRB+1) adjacent thereto may be allocated as ACK/NACK transmission resources for 2-CW transmission.

Figure 16:
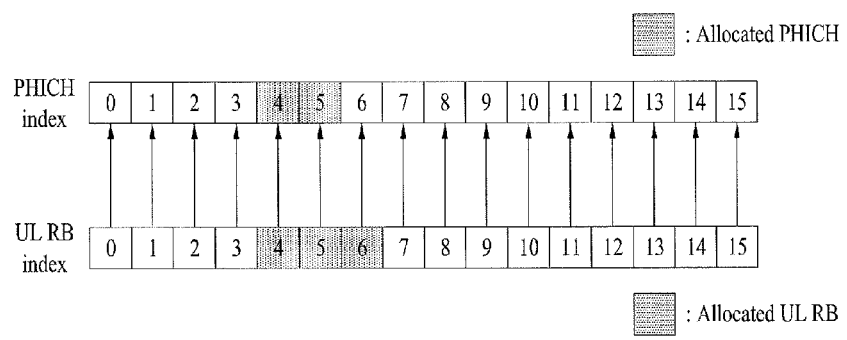
Figure 17:
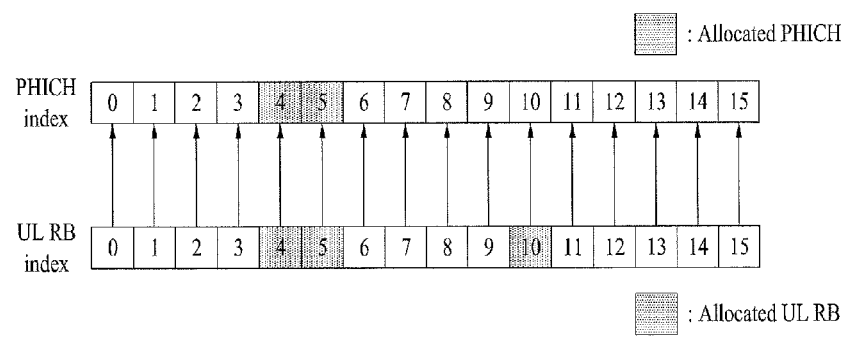
Figure 18:
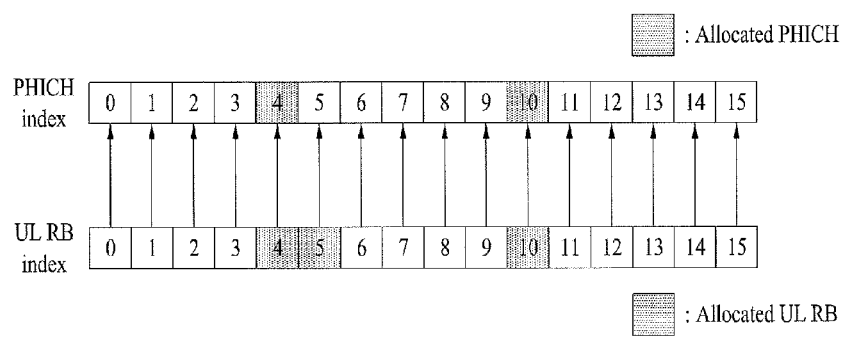
Figure 19:
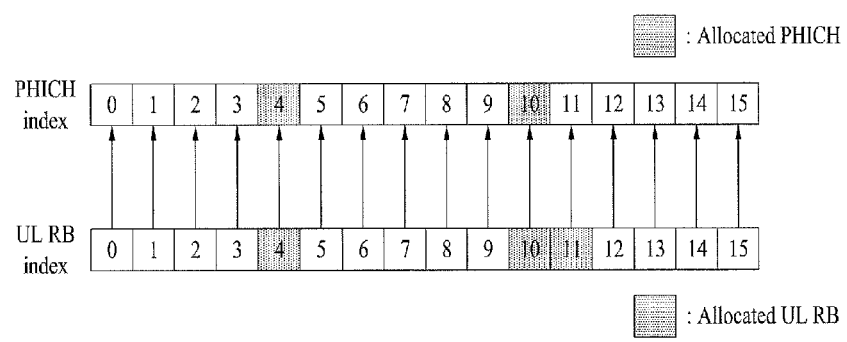

FIG. 16 to FIG. 18 show the cases in which two or more RBs are allocated to a UE for PUSCH transmission. Two PHICH resources linked to the lowest index and the second lowest index among the allocated RB indexes may be allocated as ACK/NACK transmission resources for 2-CW transmission.

In FIG. 16, a UL contiguous RA method is applied. A PHICH index mapped to the lowest RB index among UL RBs and a PHICH index adjacent thereto may be allocated as PHICH resources.

In FIG. 17 and FIG. 18, a UL non-contiguous RA method is applied. In FIG. 17, a PHICH index indicated by the lowest RB index among non-contiguous UL RBs and a PHICH index adjacent thereto may be allocated as PHICH resources. Meanwhile, in FIG. 18, a PHICH index indicated by the lowest RB index from each of non-contiguous RB groups may be allocated as PHICH resources.

If a UL contiguous RA method is applied for PUSCH transmission of a UE, two PHICH resources linked to the lowest index nRB among allocated RB indexes and an RB index nRB+1 adjacent thereto may be allocated to the UE as ACK/NACK transmission resource for 2-CW transmission (refer to FIG. 15 and FIG. 16).

If UL non-contiguous RA is applied for PUSCH transmission of a UE (i.e. two non-contiguous RB groups are allocated), two PHICH resources linked to the lowest indexes among RB indexes in the respective RB groups may be allocated to the UE as ACK/NACK transmission resources for 2-CW transmission (refer to FIG. 17 and FIG. 18).

Figure 20:
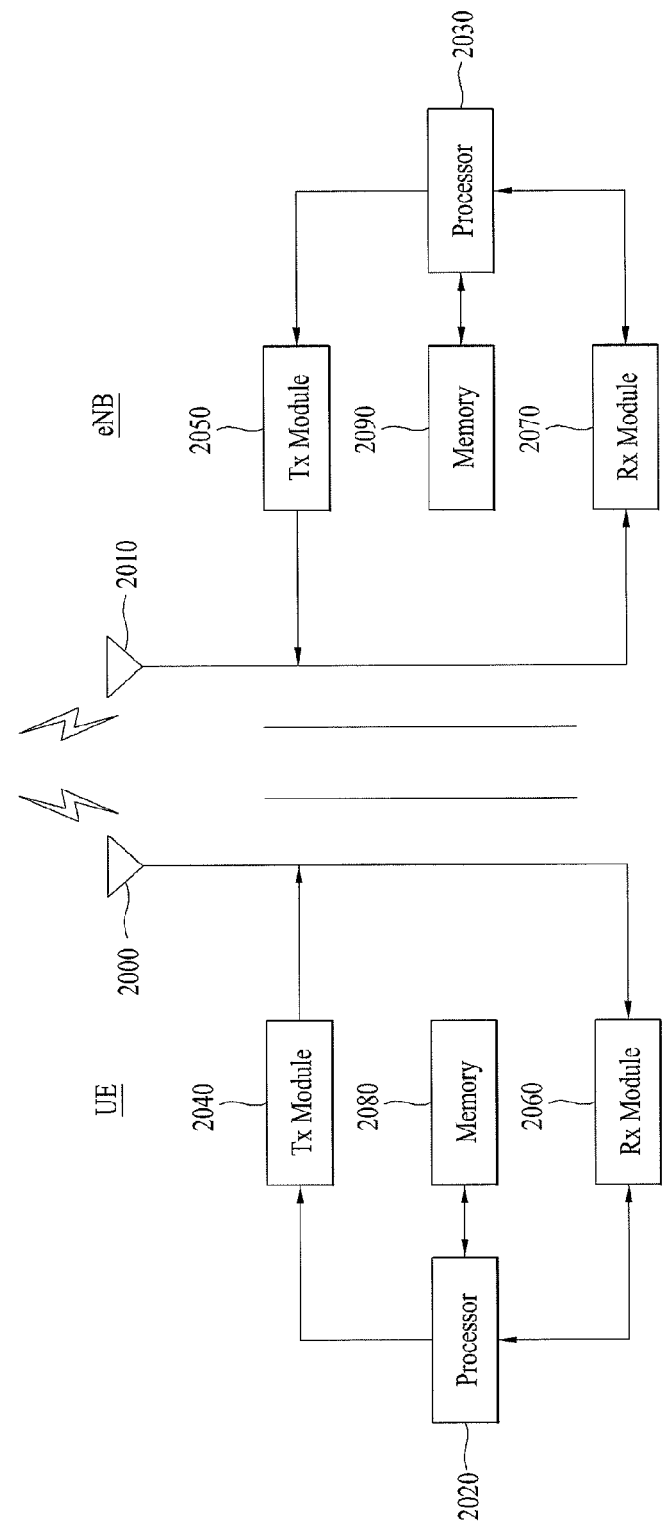
FIG. 20 is a diagram illustrating an apparatus for supporting a CSI transmission method disclosed in the present invention in accordance with an embodiment of the present invention.

FIG. 20 is a diagram illustrating an apparatus for supporting a CSI transmission method disclosed in the present invention in accordance with an embodiment of the present invention.

A UE may operate as a transmitter in UL and as a receiver in DL. An eNB may operate as a receiver in UL and as a transmitter in DL.

The UE and eNB may include Transmit (Tx) modules 2040 and 2050 and Receive (Rx) modules 2050 and 2070, respectively, for controlling transmission and reception of information, data, and/or messages, and may include antennas 2000 and 2010, respectively, for transmitting and receiving the information, data, and/or messages. The UE and eNB may include processors 2020 and 2030 for performing the embodiments of the present invention and memories 2080 and 2090 for temporarily or permanently storing processing procedure performed by the processors, respectively.

Especially, the processors 2020 and 2030 may measure and report the state of a DL channel for each serving cell activated in a carrier aggregation environment described in the embodiments of the present invention. The processors may also report CSI to the eNB depending on a CSI priority according to a CSI reporting type (or priority according to a PUCCH format). For example, if CSI for one or more serving cells should be transmitted in the same subframe according to each CSI transmission period, the processor of the UE compares priorities for the CSI and may transmit only CSI having a higher priority to the eNB.

The Tx modules and Rx modules included in the UE and the eNB may perform a packet modulation/demodulation function for data transmission, a quick packet channel coding function, Orthogonal Frequency Division Multiple Access (OFDMA) packet scheduling, Time Division Duplex (TDD) packet scheduling, and/or a channel multiplexing function. The UE and eNB of FIG. 20 may further include a low-power Radio Frequency (RF)/Intermediate Frequency (IF) module.

The apparatus described in FIG. 20 is a means for implementing the CSI reporting methods described in the embodiments of the present invention. The embodiments of the present invention may be performed using constituent elements and functions of the aforementioned UE and eNB.

Meanwhile, the UE in the present invention may be any of a Personal Digital Assistant (PDA), a cellular phone, a Personal Communication Service (PCS) phone, a Global system for Mobile (GSM) phone, a Wideband CDMA (WCDMA) phone, a Mobile Broadband System (MBS) phone, a handheld PC, a notebook PC, a smart phone, a Multi Mode-Multi Band (MM-MB) terminal, etc.

The smart phone is a terminal having the advantages of both a mobile communication terminal and a PDA and may refer to a terminal in which data communication functions such as scheduling management, fax transmission and reception, and Internet access, which are functions of the PDA, are incorporated into the mobile communication terminal. The MM-MB terminal refers to a terminal which has a multi-modem chip therein and which can operate in any of a mobile Internet system and other mobile communication systems (e.g., a CDMA2000 system, a WCDMA, etc.).

The embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiment of the present invention may be achieved by a module, a procedure, a function, etc. performing the above-described functions or operations. For example, software code may be stored in the memory units 2080 and 2090 and executed by the processors 2020 and 2030. The memory units are located at the interior or exterior of the processor and may transmit data to and receive data from the processor via various known means.

The embodiments of the present invention may be carried out in other specific ways without departing from the spirit and essential characteristics of the present invention. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention may be applied to various wireless access systems, for example, a 3GPP LTE system, a 3GPP LTE-A system, a 3GPP2 system, and/or an IEEE 802.16m system. The embodiments of the present invention may be applied to all technical fields applying the various wireless access systems, as well as the various wireless access systems.

The invention claimed is:

1. A method for reporting Channel State Information (CSI) in a wireless access system which supports carrier aggregation, the method comprising:
receiving, from a Base Station (BS) by a User Equipment (UE), information related to a CSI reporting mode for two or more downlink component carriers (DL CCs); and
reporting, to the BS by the UE, CSI for the two or more DL CCs in consideration of the CSI reporting mode,
wherein, if a CSI for a first DL CC of the two or more DL CCs having a first CSI type and a CSI for a second DL CC of the two or more DL CCs having a second CSI type are to be transmitted in a same subframe, the UE reports only CSI for one of the first DL CC and the second DL CC to the BS according to a priority of the first CSI type and a priority of the second CSI type, wherein each of the first CSI type and the second CSI type includes at least one of a Rank Indicator (RI), a first Precoding Matrix Indicator (PMI), a second PMI, a Wideband Channel Quality Indicator (WB-CQI) or a Subband CQI, and wherein the first CSI type and the second CSI type are different.

2. The method of claim 1, wherein, if a priority of the first CSI type is higher than a priority of the second CSI type, the UE transmits only the CSI having the first CSI type to the BS and drops the CSI having the second CSI type.

3. The method of claim 2, wherein reporting the CSI is periodically performed according to each content of the CSI.

4. The method of claim 2, wherein the first CSI type is a CSI reporting type 3 or a CSI reporting type 5 and the second CSI type is a CSI reporting type 2b, a CSI reporting type 2c, a CSI reporting type 4, a CSI reporting type 1, or a CSI reporting type 1a.

5. The method of claim 2, wherein the CSI having the first CSI type is transmitted to the BS through a Physical Uplink Control Channel (PUCCH) or a Physical Uplink Shared Channel (PUSCH).

6. A User Equipment (UE) for reporting Channel State Information (CSI) in a wireless access system which supports carrier aggregation, the UE comprising:

a transmission module;

a reception module; and a processor operatively connected to the transmission module and the reception module, wherein the processor is configured to:

control the reception module to receive information related to a CSI reporting mode for two or more downlink component carriers (DL CCs) from a Base Station (BS), and control the transmission module to report CSI for the two or more DL CCs to the BS in consideration of the CSI reporting mode, wherein, if a CSI for a first DL CC of the two or more DL CCs having a first CSI type and a CSI for a second DL CC of the two or more DL CCs having a second CSI type are to be transmitted in a same subframe, the UE reports only CSI for one of the first DL CC and the second DL CC to the BS according to a priority of the first CSI type and a priority of the second CSI type, wherein each of the first CSI type and the second CSI type includes at least one of a Rank Indicator (RI), a first Precoding Matrix Indicator (PMI), a second PMI, a Wideband Channel Quality Indicator (WB-CQI) or a Subband CQI, and wherein the first CSI type and the second CSI type are different.

7. The UE of claim 6, wherein, if a priority of the first CSI type is higher than a priority of the second CSI type, the UE transmits only the CSI having the first CSI type to the BS and drops the CSI having the second CSI type.

8. The UE of claim 7, wherein the first CSI type is a CSI reporting type 3 or a CSI reporting type 5 and the second CSI type is a CSI reporting type 2b, a CSI reporting type 2c, a CSI reporting type 4, a CSI reporting type 1, or a CSI reporting type 1a.

9. The UE of claim 7, wherein the CSI having the first CSI type is transmitted to the BS through a Physical Uplink Control Channel (PUCCH) or a Physical Uplink Shared Channel (PUSCH).

10. A method for reporting Channel State Information (CSI) in a wireless access system which supports carrier aggregation, the method comprising:

transmitting, by a Base Station (BS) to a User Equipment (UE), information related to a CSI reporting mode for two or more downlink component carriers (DL CCs); and receiving, at the BS from the UE, CSI for the two or more DL CCs in consideration of the CSI reporting mode, wherein, if a CSI for a first DL CC of the two or more DL CCs having a first CSI type and a CSI for a second DL CC of the two or more DL CCs having a second CSI type are to be transmitted in a same subframe, the UE reports only CSI for one of the first DL CC and the second DL CC to the BS according to a priority of the first CSI type and a priority of the second CSI type, wherein each of the first CSI type and the second CSI type includes at least one of a Rank Indicator (RI), a first Precoding Matrix Indicator (PMI), a second PMI, a Wideband Channel Quality Indicator (WB-CQI) or a Subband CQI, and wherein the first CSI type and the second CSI type are different.

11. The method of claim 10, wherein, if a priority of the first CSI type is higher than a priority of the second CSI type, the UE transmits only the CSI having the first CSI type to the BS and drops the CSI having the second CSI type.

12. The method of claim 11, wherein reporting the CSI is periodically performed according to each content of the CSI.

13. The method of claim 11, wherein the first CSI type is a CSI reporting type 3 or a CSI reporting type 5 and the second CSI type is a CSI reporting type 2b, a CSI reporting type 2c, a CSI reporting type 4, a CSI reporting type 1, or a CSI reporting type 1a.

14. The method of claim 11, wherein the CSI having the first CSI type is transmitted to the BS through a Physical Uplink Control Channel (PUCCH) or a Physical Uplink Shared Channel (PUSCH).

15. A Base Station (BS) for receiving Channel State Information (CSI) from a User Equipment (UE) in a wireless access system which supports carrier aggregation, the BS comprising:

a transmission module;

a reception module; and a processor operatively connected to the transmission module and the reception module, wherein the processor is configured to:

control the transmission module to transmit information related to a CSI reporting mode to the UE for two or more downlink component carriers (DL CCs), and control the reception module to receive CSI for the two or more DL CCs from the UE in consideration of the CSI reporting mode, wherein, if a CSI for a first DL CC of the two or more DL CCs having a first CSI type and a CSI for a second DL CC of the two or more DL CCs having a second CSI type are to be transmitted in a same subframe, the UE reports only CSI for one of the first DL CC and the second DL CC to the BS according to a priority of the first CSI type and a priority of the second CSI type, wherein each of the first CSI type and the second CSI type includes at least one of a Rank Indicator (RI), a first Precoding Matrix Indicator (PMI), a second PMI, a Wideband Channel Quality Indicator (WB-CQI) or a Subband CQI, and wherein the first CSI type and the second CSI type are different.

16. The BS of claim 15, wherein, if a priority of the first CSI type is higher than a priority of the second CSI type, the UE transmits only the CSI having the first CSI type to the BS and drops the CSI having the second CSI type.

17. The BS of claim 16, wherein the first CSI type is a CSI reporting type 3 or a CSI reporting type 5 and the second CSI type is a CSI reporting type 2b, a CSI reporting type 2c, a CSI reporting type 4, a CSI reporting type 1, or a CSI reporting type 1a.

18. The BS of claim 16, wherein the CSI having the first CSI type is transmitted to the BS through a Physical Uplink Control Channel (PUCCH) or a Physical Uplink Shared Channel (PUSCH).

* * * * *